United States Patent [19]
Mohri et al.

[11] Patent Number: 5,941,984
[45] Date of Patent: Aug. 24, 1999

[54] DATA PROCESSING DEVICE

[75] Inventors: Atsushi Mohri; Akira Yamada; Toyohiko Yoshida, all of Tokyo, Japan

[73] Assignee: Mitsubishi Denki Kabushiki Kaisha, Tokyo, Japan

[21] Appl. No.: 08/857,461

[22] Filed: May 16, 1997

[30] Foreign Application Priority Data

Jan. 31, 1997 [JP] Japan .................................. 9-019401

[51] Int. Cl.[6] .................................................. G06F 15/16
[52] U.S. Cl. ................................ 712/218; 712/23; 712/24
[58] Field of Search ........................ 395/800.23, 800.24, 395/394; 712/218, 23, 24

[56] References Cited

U.S. PATENT DOCUMENTS 5,636,353  6/1997  Ikenaga et al. ......................... 395/394
5,805,852  9/1998  Nakahashi ............................... 395/394

OTHER PUBLICATIONS

"The MMA: A Long–instruction–Word Multimedia processor"; Microprocessor Forum, Oct. 22, 1996; Shumske Kamijo; pp. 1, 4, & 5.

"Phillips Hopes to Displace DSPs with VLIW"; Microprocessor Report, Dec. 5, 1994; Brian Case; pp. 12 to 15.

Primary Examiner—William M. Treat

[57] ABSTRACT

A VLIW microprocessor in which bypaths for transferring data among pipelines are incorporated between a plurality of execution units such as a memory access unit and an integer operation unit. The data on the bypaths is directly transferred to target units according to a control signal generated by a bypath processing control circuit.

13 Claims, 29 Drawing Sheets

FIG.3(PRIOR ART)
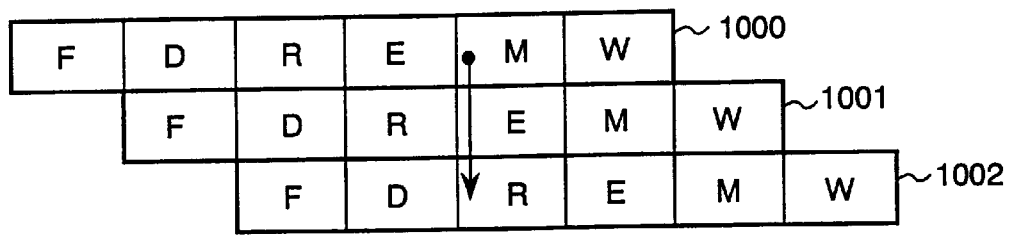
FIG.4(PRIOR ART)
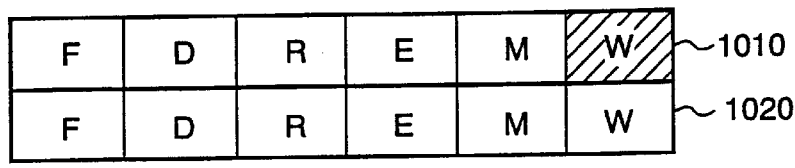
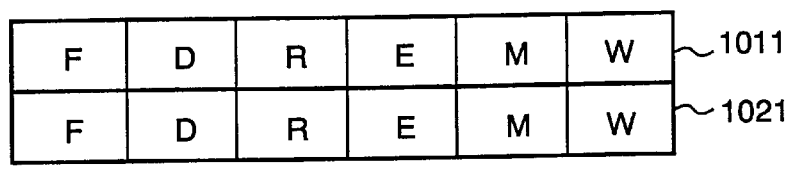
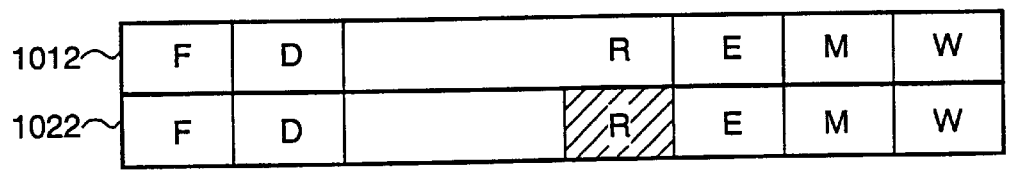

FIG.7

| CODE : FORMAT | EXECUTION ORDER | |
|---|---|---|
| | OPERATION_0 | OPERATION_1 |
| FM=00 : TWO INSTRUCTIONS | FIRST | FIRST |
| 01 : TWO INSTRUCTIONS | FIRST | SECOND |
| 10 : TWO INSTRUCTIONS | SECOND | FIRST |
| 11 : ONE INSTRUCTION | FIRST | ..... |

FIG.8

CODE : CONDITIONS TO BE EXECUTED

CC=000 : ALWAYS
001 : F0=TRUE       AND F1=DON'T CARE
010 : F0=FALSE      AND F1=DON'T CARE
011 : F0=DON'T CARE AND F1=TRUE
100 : F0=DON'T CARE AND F1=FALSE
101 : F0=TRUE       AND F1=TRUE
110 : F0=TRUE       AND F1=FALSE
111 : RESERVED

FIG.9

```
              0        7  9      15       21         27
Short_M   | OPCODE  | X  |  Ra    |  Rb   | SOURCE |      111
             120      124  121     122      123
              0        7  9      15       21         27
Short_A   | OPCODE  |x'| 0|  Ra    |  Rb   | SOURCE |     112
             120    125   121     122      123
              0        7  9      15       21         27
Short_B1  | OPCODE  |0 |0 |   0    |   0   |   Rc   |     113
             120                                126
              0        7  9                           27
Short_B2  | OPCODE  |1 |0 |       DISPLACEMENT:18    |   114
             120            127
              0        7  9      15                   27
Short_B3  | OPCODE  | Y | Z|  Ra   |     SOURCE       |   115
             120     129 130 121         128
              0        7  9      15                   27
Short_D1  | OPCODE  | Y | 0|  Ra   |     SOURCE       |   116
             120     129   121         128
              0        7  9      15                   27
Short_D2  | OPCODE  | Y | 0| ct:6  |     SOURCE       |   117
             120     129   131          128
                                                          118
              0        7  9      15       21                53
Long1     | OPCODE  |1 |0 |  Ra    |  Rb   | IMMEDIATE VALUE:32 |
             120           121     122       132
                                                          119
              0        7  9      15       21                53
Long2     | OPCODE  |1 | Z|  Ra    |  Rb   | IMMEDIATE VALUE:32 |
             120     133   121     122       132
```

(123)
X=00=>SOURCE=Rc
X=01=>SOURCE=Rc;Rb++
X=11=>SOURCE=Rc;Rb· ·
X=10=>SOURCE=IMMEDIATE VALUE:6

(123)
X'=0=>SOURCE=Rc
X'=1=>SOURCE=IMMEDIATE VALUE:6

(128)
Y=0 =>SOURCE=Rc
Y=1 =>SOURCE=IMMEDIATE VALUE:12

Z=0 =>TEST FOR ZERO
Z=1 =>TEST FOR NOT ZERO

FIG.12
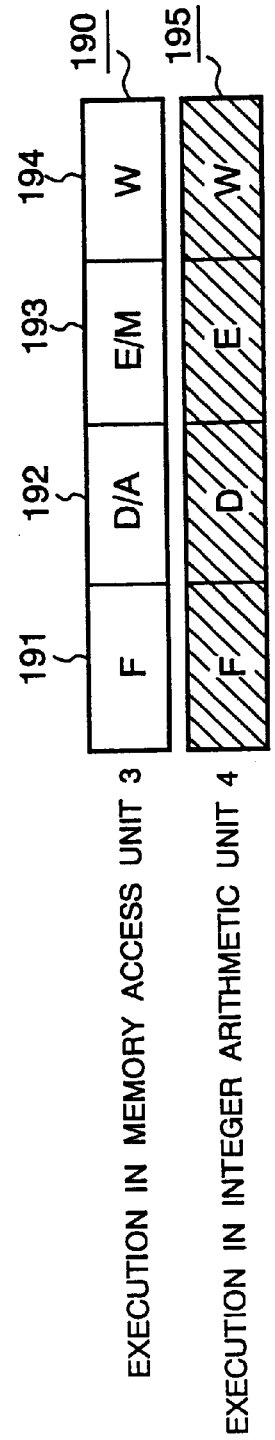
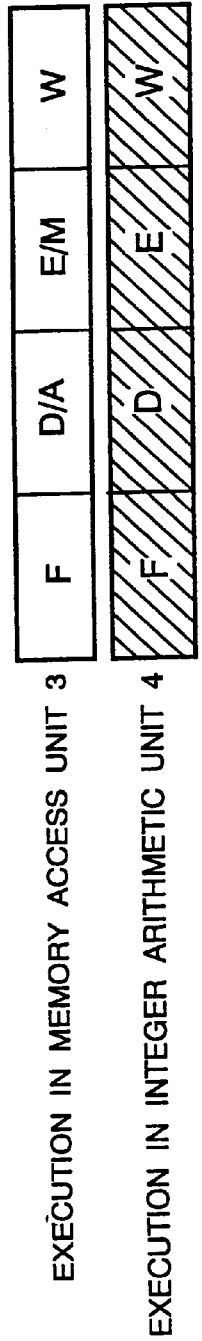
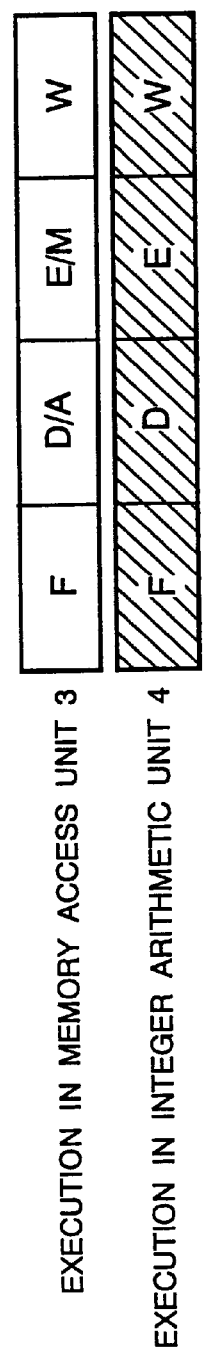

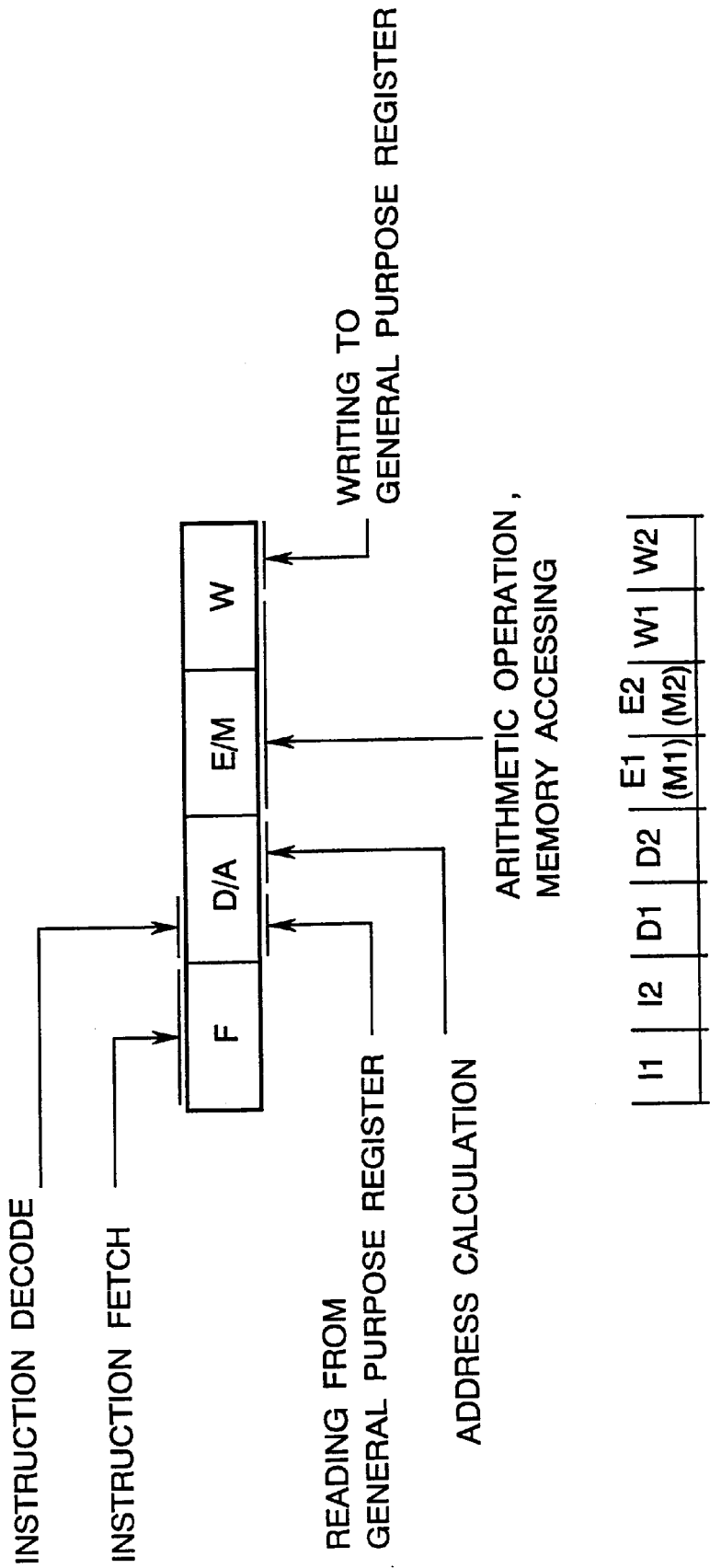

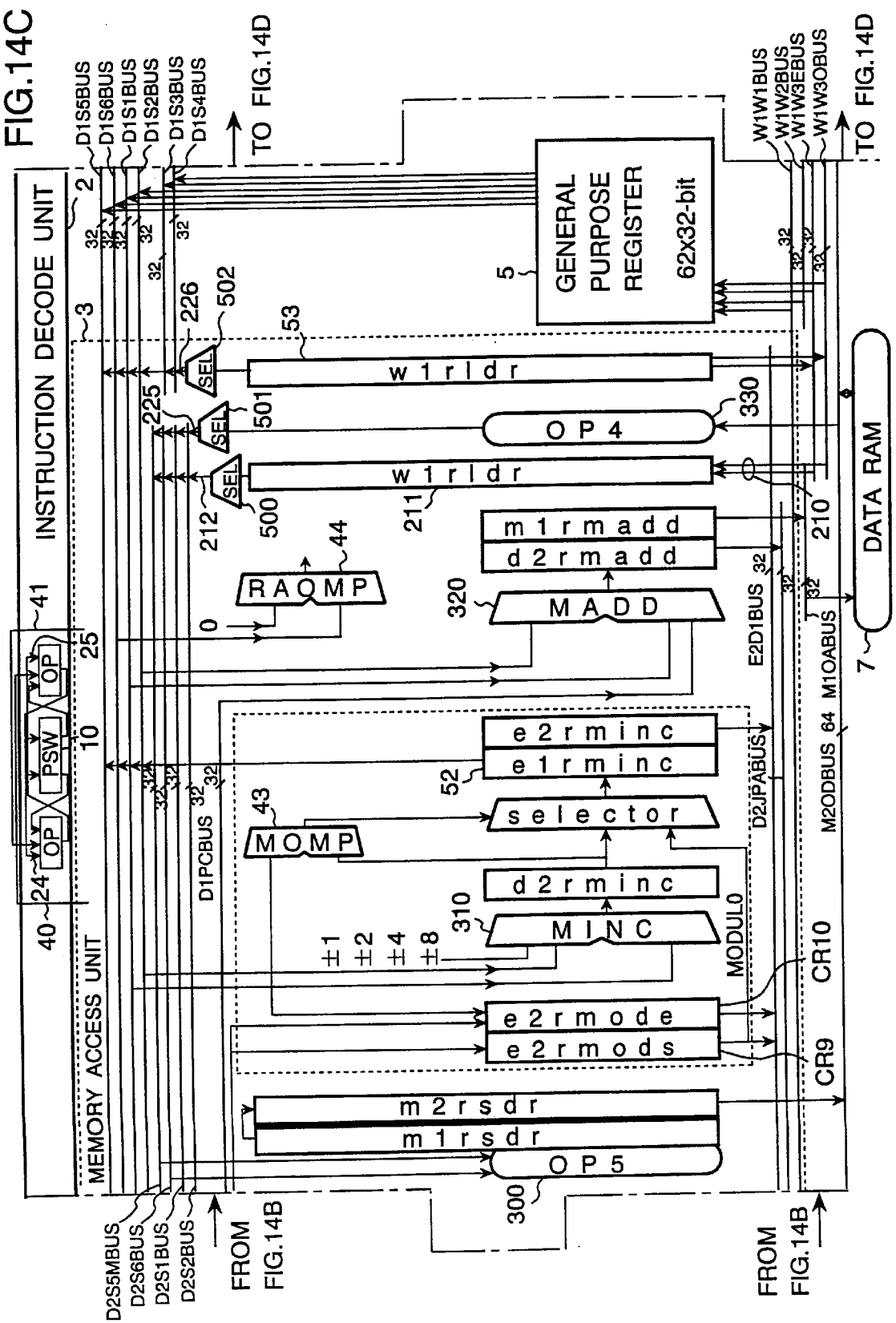

DATA PROCESSING DEVICE

BACKGROUND OF THE INVENTION

1. Field of the Invention

The present invention relates to a data processing device such as a microprocessor having pipelines for executing a plurality of sub-instructions independently and efficiently included in each single instruction even if a data hazard happens between the pipelines.

2. Description of the Prior Art

A single instruction including a plurality of sub-instructions to be executed by a plurality of execution units in a microprocessor as a data processing device is referred to as "Very Long Instruction Word" (VLIW) and the microprocessor based on such VLIW architecture is called the VLIW microprocessor.

The VLIW microprocessor executes a single instruction including sub-instructions to be executed by a plurality of execution units, for example, arithmetic and logic units (ALUs) as execution units and this VLIW microprocessor controls the operations of the plurality of execution units. When the instruction code is generated in the microprocessor, it is possible to set sub-instructions to be executed in each of the execution units into a single instruction certainly. This causes an increase in the utilization efficiency of each execution unit in the microprocessor. In addition to this effect, it is also possible to eliminate decode circuits each for specifying each execution unit to execute each sub-instruction from the microprocessor. As a result, the microprocessor has the advantage that the instruction decode operation can be executed at a high speed.

There is a multi-media (MMA) microprocessor that has been published in the Microprocessor Forum that was held on Oct. 22 and 23, 1996 in Japan, as one example of conventional VLIW microprocessors.

FIG. 1 is a schematic diagram showing a core-section of a conventional MMA microprocessor which is capable of executing VLIW architecture instructions. In FIG. 1, the reference number 900 designates the conventional microprocessor core, 901 denotes an execution unit for executing VLIW instructions of MMA, 902 indicates another execution unit for executing VLIW instructions of MMA, and 904 designates a data random access memory (a data RAM). Thus, the conventional MMA microprocessor is capable of executing two sub-instructions included in a single VLIW instruction by using the execution units 901 and 902 simultaneously.

The execution unit 901 comprises a multiplier 910, an accumulator 911, a shifter 912, and an arithmetic logic unit (ALU) 913. The execution unit 902 comprises an ALU 914 and a load store unit 915. The reference numbers 920 and 921 denote source data buses used for operation units such as multiplier 910, the accumulator 911, the shifter 912 and the ALU 913 included in the execution unit 901, through which data items to be used for the operation are read from the general purpose register file 903 and then the data items are transferred. The reference numbers 930 and 931 designate source buses used for the arithmetic logic unit (ALU) 914 and the load store unit 915 included in the execution unit 902, through which data items to be used for operation are read from the general purpose register file 903.

The reference number 925 designates a write-back bus through which the operation results in the execution unit 901 are written into the general purpose register file 903. The reference numbers 932 and 933 denote write-back buses through which the operation result in the execution unit 902 is written into the general purpose register file 903. The reference number 922 and 933 designate buses through which the operation result of the multiplier 910 is transferred to the accumulator 911 in order to accumulate it without penalty. The reference number 940 designates bi-directional buses, through which the load/store unit 915 and the data RAM 904 are connected to each other, used for controlling load/store operation of operand data items.

FIG. 2 is a block diagram showing a pipeline of a part of the circuit of the execution unit 901 incorporated in the MMA microprocessor shown in FIG. 1. In FIG. 2, the reference number 903 designates the general purpose register file, 913 denotes the ALU, and 910a and 910b indicate parts used for multiplication operation, namely, tree circuit of Wallace and CPA, respectively.

In the execution unit 901, it is possible to execute the multiplication operation within two stages of the pipeline. The reference number 921 designates a source data bus through which source data items are read from the general purpose register file 903. The reference number 925 denotes a write-back bus through which the operation result is written into the general purpose register file 903. The reference numbers 970, 971 and 972 denote tri-state buffers for driving data to the source data bus 921. The reference number 980 designates a bypath for outputting the operation result of the ALU 913 to the source data bus 921, and 981 indicates a bypath for outputting the multiplication result to the source data bus 921.

As shown in FIG. 2, the execution of one instruction requires six stages of a pipeline, a Fetch (F) stage, a Decode (D) stage, a data Read (R) stage, an Execution (E) stage, a Memory access (M) stage, a Write (W) back stage. Each of these six stages are executed in the pipeline. Thus, because one instruction is executed in the six stages of the pipeline data path registers (DR) 950, 951, 952, 953, 954, 955, and 956 shown in FIG. 2 are incorporated in the MMA microprocessor core 900.

The reference number 960 designates an instruction decoder in which control path registers used for control paths are incorporated in the MMA microprocessor core 600 in order to process control signals in the pipeline. The output signal from the control path register 962 is a write enable signal used for the data path register 950. The output signal from the control path register 963 is a write enable signal used for the tri-state buffers 971 and 972. The output signal from the control path register 964 is a write enable signal used for the tri-state buffer 970.

FIG. 3 is a timing chart of the pipeline of bypath processing in pipeline supported by the execution unit 901 shown in FIG. 2. As shown in FIG. 3, one instruction is executed in six stages of the pipeline. The reference numbers 1000, 1001, and 1002 designate three continuous instructions that are executed in the pipeline by the execution unit 901.

As has been explained in FIG. 2, the results of the ALU 913 and the multiplier 910 are transferred to the bypaths 980 and 901 at the M stage. The bypath data items obtained in the M stage of the pipeline are transferred to the source data bus 921 at the R stage of the pipeline. Thus, when both a destination designation field of an instruction code to be executed in the pipeline 1000 and a source designation field on an instruction code to be executed in the pipeline 1002 are same, the bypath processing from the M stage of the pipeline 1000 to the R stage of the pipeline 1002 is executed. The possible combinations of instructions executed by bypath processing are executed between ALU operation instructions, between multiplication instructions, and between a ALU operation instruction and a multiplication instruction.

FIG. 4 is a diagram showing a pipeline when a data hazard happens between the execution unit 901 and the other execution unit 902 shown in FIG. 1. In FIG. 4, the reference numbers 1010, 1011 and 1012 designate pipelines to be executed by the execution unit 901, 1020, 1021 and 1022 denotes pipelines to be executed by the other execution unit 902. When both a destination designation field of an instruction code to be executed in the pipeline 1010 and a source designation field on an instruction code to be executed in the pipeline 1022 are same, as shown by the shadowed portions in FIG. 4, a data item is read from the general purpose register file 903 in the R stage of the pipeline 1022 after the execution result of the pipeline 1010 is written into the general purpose register file 903 at the W stage. In this case, it must be required to halt the execution of the R stage in the pipeline 1022 until the execution of the W stage of the pipeline 1010 is completed. The pipeline 1012 is also executed in synchronization with the execution of the pipeline 1022.

As explained above, because the conventional architecture's VLIW microprocessor has the configuration described above, when data hazards occur between instructions to be executed in different pipelines, it is required to halt the execution of the pipelines for several clock time periods in order to keep or guarantee data values correctly. This causes a reduction in the instruction processing speed of the microprocessor.

SUMMARY OF THE INVENTION

Accordingly, an object of the present invention is, with due consideration to the drawbacks of the conventional microprocessor of the VLIW architecture that is capable of executing a plurality of pipelines, to provide a data processing device of a VLIW architecture incorporating dedicated bypaths between different pipelines, that is capable of efficiently executing instruction processing at a high speed.

In accordance with a preferred embodiment of the present invention, a data processing device comprises, instruction decode means connected to memories for storing instructions such as an instruction including a plurality of sub-instructions and data, for decoding the instructions, a plurality of instruction execution means, connected to the instruction decode means, having control registers for storing data used for controlling the execution of the instructions, a plurality of registers, and operation circuits for executing arithmetic operations based on the instructions, according to decode results provided by the instruction decode means, data transfer paths incorporated among the plurality of instruction execution means, for transferring data among the plurality of instruction execution means, control means incorporated in the instruction decode means for generating a control signal to be used for controlling the data transfer operation executed through the data transfer paths, and selection means, placed in the data transfer paths, for selecting whether or not the data transfer is executed through the data transfer paths according to the control signal transferred from the control means, wherein the data transfer is directly executed among the plurality of instruction execution means without through the plurality of registers. Thereby, even if data hazard happens among the plurality of instruction codes executed in different pipelines, data can be directly transferred between the plurality of execution means through the data transfer paths. It becomes possible to execute instructions efficiently, while keeping the data correct without stopping the pipeline operations.

In the data processing device as another preferred embodiment of the present invention, the two instruction execution means and the selection means are incorporated. The selection means comprises tri-state buffer and a selector. The control means has comparison means for comparing a destination register designation field of a preceding sub-instruction with a source register designation field of the sub-instruction to be executed by another pipeline, and the operation of the selection means is controlled based on a comparison result of the comparison means. Thereby, even if data hazard happens among the plurality of instruction codes executed in different pipelines, data can be directly transferred between the plurality of execution means through the data transfer paths. It becomes possible to execute instructions efficiently while keeping the data correct without stopping the pipeline operations.

In the data processing device as another preferred embodiment of the present invention, the two instruction execution means and the selection means are incorporated. The selection means comprises a tri-state buffer. When the preceding sub-instruction is a load sub-instruction, the comparison means incorporated in the control means compares a destination register designation field of the load sub-instruction with a source register designation field of the load sub-instruction to be executed by other pipeline, and a data item transferred through the data transfer path is driven to a source bus connected to the instruction execution means according to the operation of the selection means that being controlled based on a comparison result of the comparison means. Even if data hazard happens about a load data item in the load sub-instruction executed by one pipeline, data can be directly transferred between the plurality of execution means through the data transfer paths. Thereby, it becomes possible to execute instructions efficiently while keeping the data correct without stopping the pipeline operations.

In the data processing device as another preferred embodiment, the two instruction execution means and the selection means are incorporated. The selection means comprises a tri-state buffer. When the preceding sub-instruction is a multiple sub-instruction, the comparison means incorporated in the control means compares a destination register designation field of the multiple sub-instruction with a source register designation field of the multiple sub-instruction to be executed by other pipeline. A data item transferred through the data transfer path is driven to a source bus connected to the instruction execution means according to the operation of the selection means that being controlled based on a comparison result of the comparison means. Thereby, even if a data hazard is caused by the execution result of the multiple sub-instruction executed by one pipeline, data can be directly transferred between the plurality of execution means through the data transfer paths. It becomes possible to execute instructions efficiently while keeping the data correct without stopping the pipeline operations.

In the data processing device as another preferred embodiment, the two instruction execution means and the selection means are incorporated. The selection means comprises a tri-state buffer. When the preceding sub-instruction is an arithmetic sub-instruction, the comparison means incorporated in the control means compares a destination register designation field of the arithmetic sub-instruction with a source register designation field of the arithmetic sub-instruction to be executed by another pipeline. A data item transferred through the data transfer path is driven to a source bus connected to the instruction execution means according to the operation of the selection means that is being controlled based on the comparison result of the comparison means. Thereby, even if a data hazard happens by the execution result of the arithmetic sub-instruction executed by one pipeline, data can be directly transferred between the plurality of execution means through the data transfer paths. It becomes possible to execute instructions efficiently while keeping the data correct without stopping the pipeline operations.

In the data processing device as another preferred embodiment, the two instruction execution means and the selection means are incorporated. The selection means comprises a selector. When the preceding sub-instruction is a flag operation sub-instruction, the comparison means incorporated in the control means compares a destination register designation field of the flag operation sub-instruction with a source flag designation field of the flag operation sub-instruction to be executed by another pipeline. A data item transferred through the data transfer path is selected by controlling the operation of the selection means based on the comparison result of the comparison means. Thereby, even if a data hazard happens by the execution result of the flag operation sub-instruction executed by one pipeline, data can be directly transferred between the plurality of execution means through the data transfer paths. It becomes possible to execute instructions efficiently while keeping the data correct without stopping the pipeline operations.

In the data processing device as another preferred embodiment, the two instruction execution means and the selection means are incorporated. The selection means comprises a selector. When the preceding sub-instruction is an arithmetic sub-instruction by which a flag being generated, the comparison means incorporated in the control means compares a predetermined flag update position of the arithmetic sub-instruction with a source flag designation field of the flag operation sub-instruction to be executed by other pipeline. A data item transferred through the data transfer path is selected by controlling the operation of the selection means based on the comparison result of the comparison means. Thereby, even if a data hazard happens by the execution result of the arithmetic sub-instruction generating a flag executed by one pipeline happens, data can be directly transferred between the plurality of execution means through the data transfer paths. It becomes possible to execute instructions efficiently while keeping the data correct without stopping the pipeline operations.

In the data processing device as another preferred embodiment, the two instruction execution means and the selection means are incorporated. The selection means comprises a tri-state buffer. The control means comprises the comparison means whose bit size corresponds to an operand size of a destination register designation field of the preceding sub-instruction and an operand size of a source register designation field of the sub-instruction to be executed by other pipeline, and the operation of the selection means is controlled based on the comparison result of the comparison means in the control means, and a data item transferred through the data transfer path and the selector connected to the data transfer path is driven to a source bus connected to the instruction execution means. Thereby, even if a data hazard about different operand sizes happens among instruction codes executed by the plurality of pipelines, data can be directly transferred between the plurality of execution means through the data transfer paths. It becomes possible to execute instructions efficiently while keeping the data correct without stopping the pipeline operations.

In the data processing device as another preferred embodiment, the selection means comprises a tri-state buffer and a selector. The comparison means incorporated in the control means compares a destination register designation field of the preceding sub-instruction with a source register designation field of a sub-instruction to be executed by a plurality of pipelines. The operation of the selection means is controlled by the control means based on a comparison result of the comparison means. Thereby, even if a data hazard happens among the plurality of pipelines by the execution result of the instruction code executed by one pipeline, data can be directly transferred between the plurality of execution means through the data transfer paths. It becomes possible to execute instructions efficiently while keeping the data correct without stopping the pipeline operations.

In the data processing device as another preferred embodiment, the selection means comprises a tri-state buffer. When the preceding sub-instruction is a load sub-instruction, the comparison means incorporated in the control means compares a destination register designation field of the load sub-instruction with a source register designation field of the load sub-instruction to be executed by a plurality of pipelines. A data item transferred through the data transfer path is driven to a source bus connected to a plurality of instruction execution means according to a comparison result of the comparison means. Thereby, even if a data hazard happens among the plurality of pipelines by the load data of the load instruction executed by one pipeline, data can be directly transferred between the plurality of execution means through the data transfer paths. It becomes possible to execute instructions efficiently while keeping the data correct without stopping the pipeline operations.

In the data processing device as another preferred embodiment, the selection means comprises a tri-state buffer. When the preceding sub-instruction is a multiple sub-instruction, the comparison means incorporated in the control means compares a destination register designation field of the multiple sub-instruction with a source register designation field of the multiple sub-instruction to be executed by a plurality of pipeline. A data item transferred through the data transfer path is driven to a source bus connected to a plurality of instruction execution means according to the operation of the selection means controlled based on the comparison result of the comparison means. Thereby, even if a data hazard happens among the plurality of pipelines by the execution result of the multiple sub-instruction executed by one pipeline, data can be directly transferred between the plurality of execution means through the data transfer paths. It becomes possible to execute instructions efficiently while keeping the data correct without stopping the pipeline operations.

In the data processing device as another preferred embodiment, the selection means comprises a selector. When the preceding sub-instruction is a flag operation sub-instruction, the comparison means incorporated in the control means compares a destination flag designation field of the flag operation sub-instruction with a source flag designation field of the flag operation sub-instruction to be executed by a plurality of pipelines. A data item transferred through the data transfer path is selected by controlling the operation of the selection means based on the comparison result of the comparison means. Thereby, even if a data hazard happens among the plurality of pipelines by the flag generated by executing the flag operation sub-instruction executed by one pipeline, data can be directly transferred between the plurality of execution means through the data transfer paths. It becomes possible to execute instructions efficiently while keeping the data correct without stopping the pipeline operations.

In the data processing device as another preferred embodiment, the selection means comprises a tri-state buffer. The control means further comprises the comparison means whose bit size corresponds to an operand size of a destination register designation field of the preceding sub-instruction and corresponding also to an operand size of a source register designation field of the sub-instruction to be executed by a plurality of pipelines. The operation of the selection means is controlled based on the comparison result of the comparison means. A data item transferred through the data transfer path and the selector connected to the data transfer path is driven to a source bus connected to the plurality of instruction execution means. Thereby, even if data hazard about different operand sizes happens among the plurality of pipelines by the execution result of the instruction code executed by one pipeline, data can be directly transferred between the plurality of execution means through the data transfer paths. It becomes possible to execute instructions efficiently while keeping the data correct without stopping the pipeline operations.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 3 is a timing chart showing bypath processing executed by the execution unit shown in FIG. 1.

FIG. 4 is an explanation diagram showing a pipeline processing when a data hazard happens between different execution units incorporated in the conventional VLIW microprocessor shown in FIG. 1.

FIG. 7 is an explanation diagram showing a detailed configuration of a format field (FM) in each of the instruction formats, as shown in FIGS. 6A and 6B, used in the VLIW microprocessor of the present invention shown in FIGS. 6A and 6B.

FIG. 8 is an explanation diagram showing a detailed configuration of an execution condition field (CC) in each of the instruction formats, as shown in FIGS. 6A and 6B, used in the VLIW microprocessor of the present invention shown in FIGS. 5.

FIG. 9 is an explanation diagram showing an instruction format used in the VLIW microprocessor of the present invention shown in FIG. 5.

FIGS. 10A, 103, and 10C are explanation diagrams showing the configuration of registers incorporated in the VLIW microprocessor of the present invention shown in FIG. 5.

FIG. 12 is an explanation diagram showing a pipeline operation of execution of two instruction executed in parallel in the VLIW microprocessor of the present invention shown in FIG. 5.

FIG. 13 is an explanation diagram showing pipeline operation of the VLIW microprocessor of the present invention shown in FIG. 5.

FIGS. 14A, 14B, 14C, and 14D are block diagrams showing a detailed configuration of execution units in the VLIW microprocessor of the present invention shown in FIG. 5.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the data processing device according to the present invention will now be described with reference to the drawings.

First Embodiment

Basic Configuration of a VLIW Microprocessor

The VLIW (Very Long Instruction Word) microprocessor having a VLIW architecture (hereinafter, referred to as VLIW architecture microprocessor or VLIW microprocessor) as the data processing device according to the present invention has at least two or more instruction execution pipelines. At first, the basic configuration of the VLIW microprocessor of following preferred embodiments 1 to 12 of the present invention will be explained.

Hardware Configuration

Figure 1:
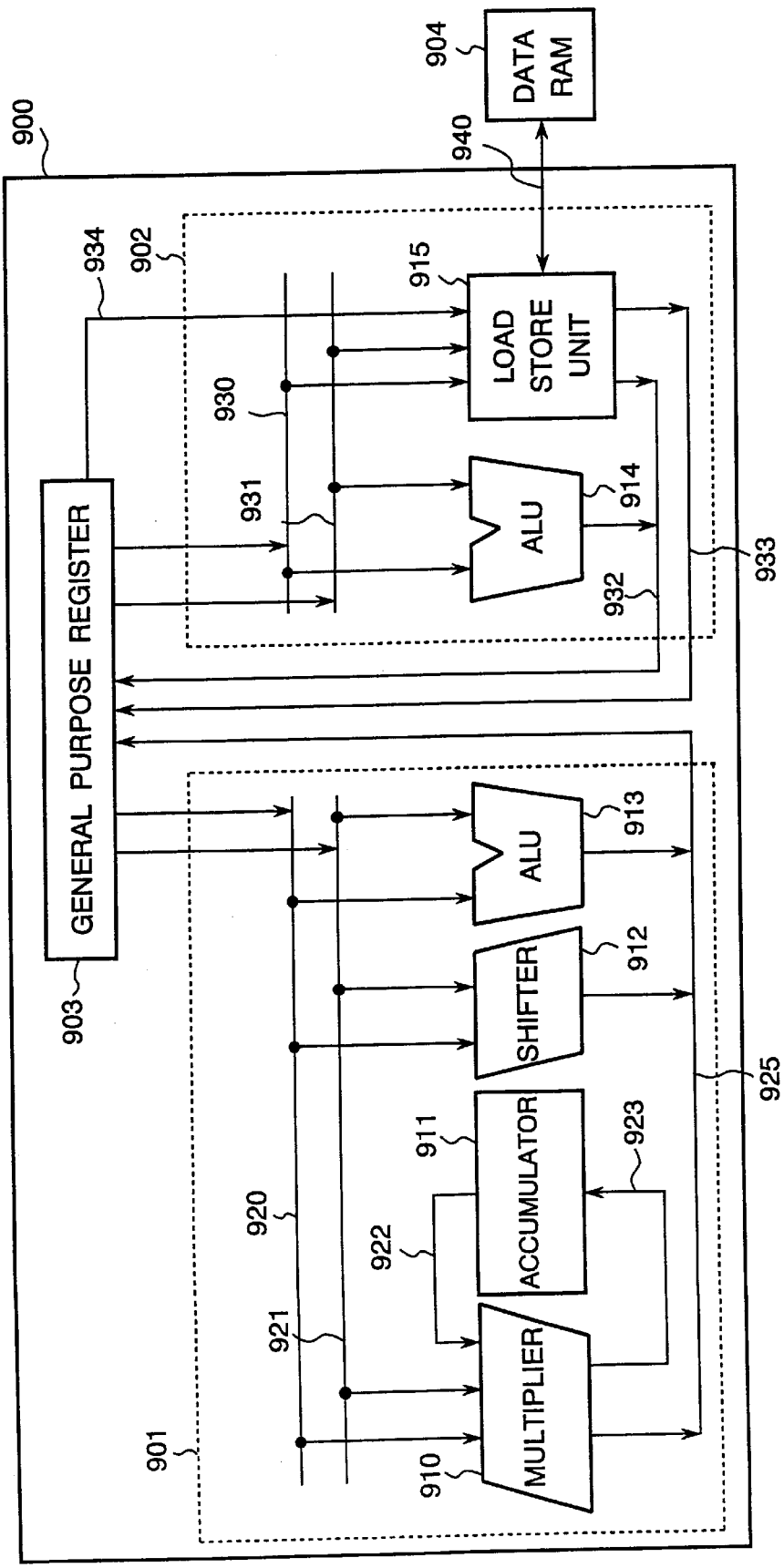
FIG. 1 is a block diagram showing a configuration of a conventional VLIW microprocessor.
Figure 2:
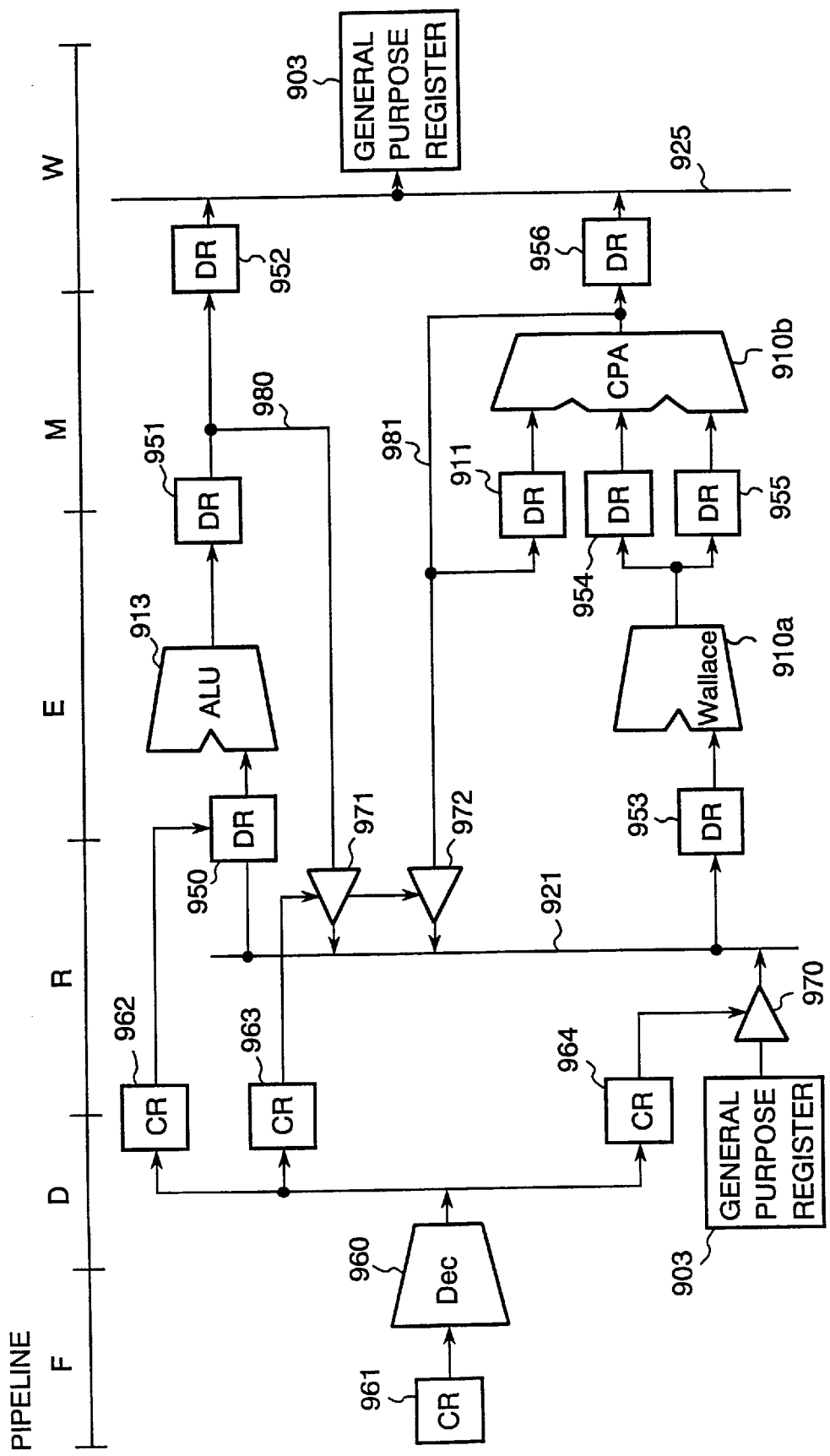
FIG. 2 is a block diagram showing a detailed configuration of one execution unit incorporated in the conventional VLIW microprocessor.
Figure 5:
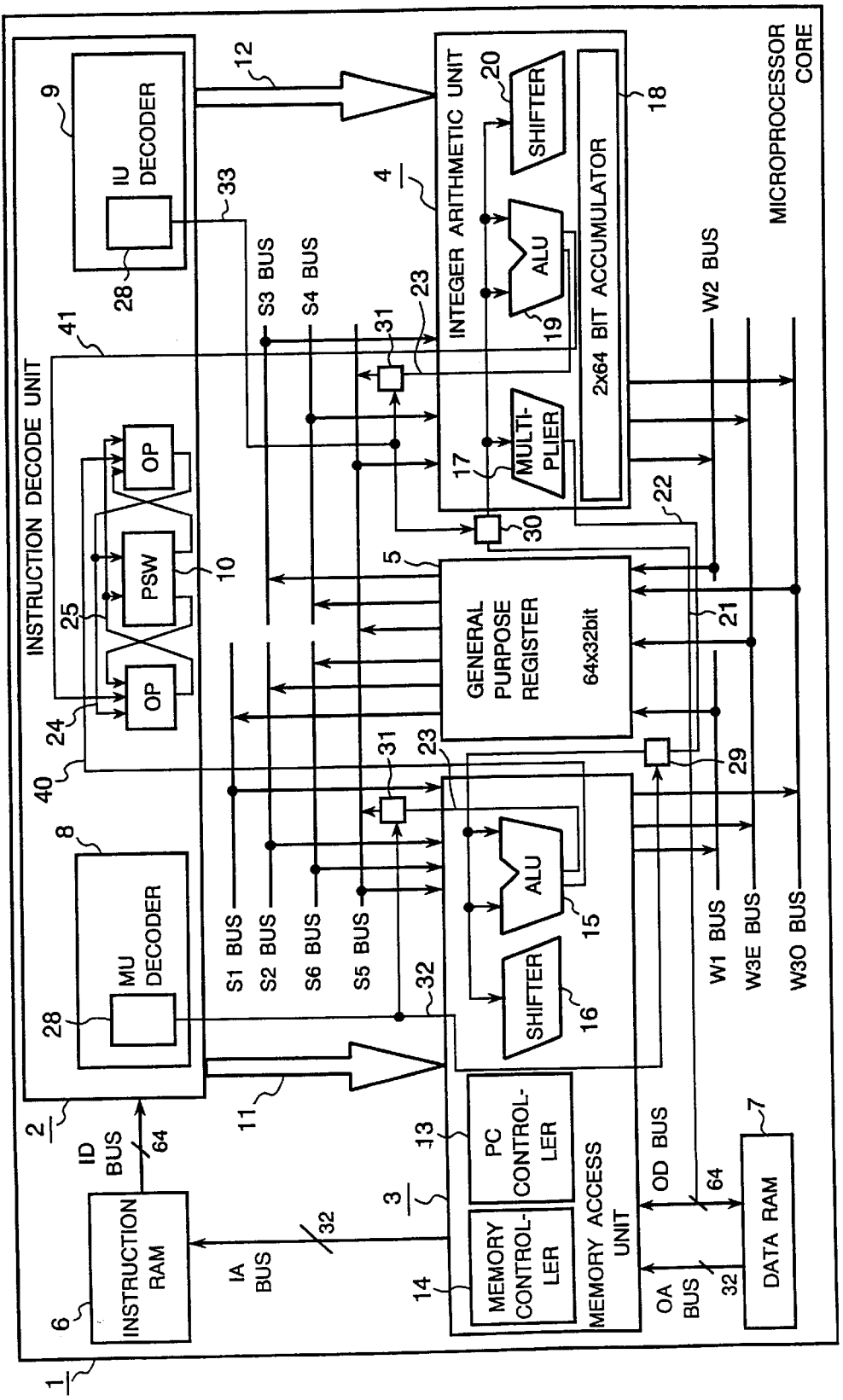
FIG. 5 is a block diagram showing a configuration of a VLIW microprocessor according to the present invention.

FIG. 5 is a block diagram showing the basic entire configuration of the VLIW microprocessor according to the present invention. In FIG. 5, the microprocessor core 1 (data processing device) comprises an instruction decode unit 2 as one example of a instruction decode means, a memory access unit 3 as one example of an instruction execution means, an integer operation unit 4 as one example of an instruction execution means, a general purpose register file 5, an instruction random access memory (RAM) 6, and a data RAM 7.

The VLIW microprocessor 1 has bypaths 21–25, 40 and 41 as data transfer paths for transferring data items between operation units in cross-bypath processing, a bypath processing control circuit 28 as one example of a control means for controlling the operation of the cross-bypath processing, tri-state buffers 29–31 as examples of selection means for selecting data transfers in the bypaths 21–23 under the control of the bypath processing control means 28, and selectors. The bypath processing control circuit 28 is incorporated in each of the MU decoder 8 and the IU decoder 9. Those components of the VLIW microprocessor 1 will be explained later in detail.

The instruction decode unit 2 decodes instruction codes transferred from the instruction RAM 6 through a 64 bit wide ID bus by using the MU decoder 8 and the IU decoder 9 therein. The instruction decode unit 2 generates a control signal 11 to be transferred to the memory access unit 3 by using the decode result of the MU decoder 8 and the value stored in a processor status word (PSW) 10, and it also generates a control signal 12 to be transferred to the integer operation unit 4 based on the decode result of the IU decoder 9 and the value stored in the PSW 10.

The memory access unit 3 comprises a program counter (PC) control section 13, a memory control section 14, ALU 15, a shifter 16. The PC control section 13 calculates the PC value of a following instruction to be executed by adding or incrementing the PC value of the current instruction by eight (8) when the following instruction to be executed does not require a jump operation or is not a branch instruction. When the following instruction to be executed is a jump instruction or a branch instruction, the PC control section 13 adds the PC value of the current instruction to be executed by the value of a branch displacement or performs the calculation according to the addressing mode designated by the operation.

The memory control section 14 accesses the instruction RAM 6 based on the PC value calculated by the PC control section through the IA bus. In addition to this, the memory control section 14 accesses the data RAM 7 in order to get data to be required for executing instructions through the OA bus for transferring addresses of data in the data RAM 7 and the OD bus for transferring data stored in the data RAM 7. Then, the memory control section 14 transfers the accessed data items to the general purpose register file 5 through the OD bus.

The ALU 15 and the shifter 16 in the memory access unit 3 perform the arithmetic logical operation and the shift operation, respectively, by using data items of maximum 3 words transferred from the general purpose register file 5 through the 32-bit wide Si bus, the 32 bit-wide S2 bus, the 32 bit-wide S6 bus. The operation results are transferred to the general purpose register file 5 through the W1 bus.

The 32 bit-wide data read from the general purpose register file 5 is transferred to the memory access unit 3 through the S1 bus, S2 bus, S6 bus, and S5 bus as the maximum 4 word data. Thereby, it is possible to execute a 2-word store instruction from the general purpose register file 5 to the data RAM 7.

In the execution of a two word data, a memory address is calculated by using two operands and then a two word data item is transferred to the data RAM 7. The memory access unit 3 transfers the operation result and the two word load data items transferred from the data RAM 7 to the general purpose register file 5.

The integer operation unit 4 comprises a multiplier 17, an accumulator 18, a ALU 19, and a shifter 20. Each of the multiplier 17, the ALU 19, and the shifter 20 performs the arithmetic logical operation and a shift operation by using a maximum 3 word data item transferred from the general purpose register file 5 through the 32-bit wide buses S3, S4, and S5. Then, the integer operation unit 4 transfers the operation result to the general purpose register file 5 through the W2 bus, W3E bus, and W3O bus.

The accumulator 18 accumulates or subtracts accumulately the result of the multiplication operation and stores the accumulated result. The maximum six kinds of register values read can be read simultaneously from the general purpose register file 5. Each of the data items read from the general purpose register file 5 is transferred to the S1 bus, S2 bus, S3 bus, S4 bus, S5 bus, and S6 bus, respectively. In addition to this, because the general purpose register 5 is connected to the W1 bus, W2 bus, W3E bus, and W3O bus, it is possible to write a maximum of four kinds of register values into the general purpose register file 5, through W1 bus, W2 bus, W3E bus, and W30 bus.

The instruction RAM 6 is connected to a 32-bit wide IA bus and a 64-bit wide ID bus. Thereby, an instruction data item of a 64-bit length corresponding to an address to be transferred through the IA bus is read from the instruction RAM 6. The data RAM 7 is connected to a 32 bit-wide OA bus and a 64 bit-wide OD bus. The data item having a 64-bit length corresponding to an address transferred through the OA bus is written into the data RAM 7 and is also read from the data RAM 7.

Figure 6:
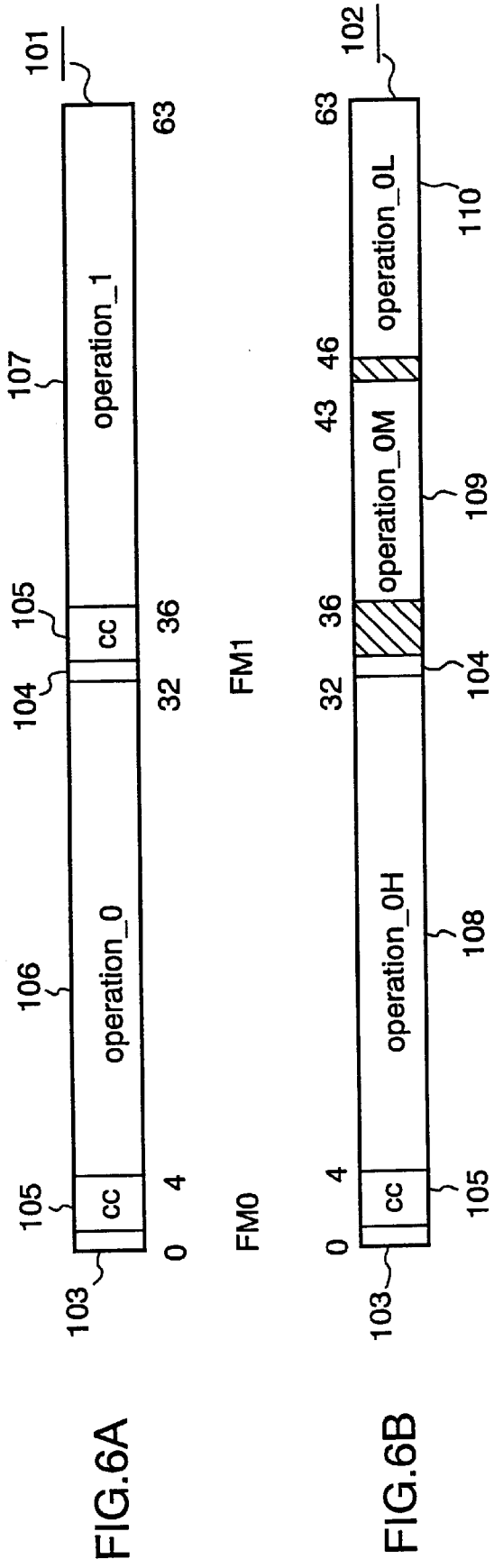
FIGS. 6A and 6B are explanation diagrams showing instruction formats used in the VLIW microprocessor of the present invention shown in FIG. 5.

FIGS. 6A and 6B are explanation diagrams showing instruction formats used in the VLIW microprocessor of the present invention shown in FIG. 5.

As shown in FIGS. 6A and 6B, the VLIW microprocessor 1 according to the present invention has a two sub-instruction format 101 and a single instruction format 102, respectively. The two sub-instruction format 101 indicates two operations. The single instruction format 102 indicates one instruction.

The two sub-instruction format 101 includes a format field consisting of fields 103 and 104, two operation fields 106 and 107 and two 3-bit CC fields 105, namely execution condition fields, related to the operation fields 106 and 107, respectively.

The single instruction format 102 has a format field consisting of fields 103 and 104, an operation field 108, an operation field 109, an operation field 110, and a 3-bit CC field 105, namely execution condition fields related to the operation field 105.

FIG. 7 is an explanation diagram showing a detailed configuration of the format field (FM) that is made up of the fields 103 and 104 in each of the instruction format 101 and 102, as shown in FIGS. 6A and 6B. In FIG. 7, when FM=00, the instruction to be executed is a two-operation instruction. In this case, both operations, the operation__0 indicated by the operation field 106 and the operation__1 indicated by the operation field 107, are executed concurrently in the clock cycle immediately following the decoding operation. The operation__0 is executed in the memory unit 3 and the operation__1 is performed in the integer operation unit 4.

When FM=01, the instruction to be executed is a two-operation instruction. In this case, the operation__0 indicated by the operation field 106 is executed in the clock cycle immediately following the decoding operation and then operationa__1 indicated by the operation field 107 is executed in a clock cycle which is delayed from the execution of the operation__0 by one cycle.

When FM=10, the instruction to be executed is a two operation instruction. In this case, the operation__1 indicated by the operation field 107 is executed in the clock cycle immediately following the decoding operation and then operation__0 indicated by the operation field 106 is executed in a clock cycle which is delayed from the execution cycle of the operation__1 by one cycle.

When FM=11, the instruction to be executed is a single operation instruction. In this case, the operation indicated by using the operation field consisting of the fields 108, 109, and 110 is executed in the clock cycle immediately following the decoding cycle.

FIG. 8 is an explanation diagram showing a detailed configuration of the execution condition field (CC) 105 in each of the instruction formats 101 and 102, as shown in FIGS. 6A and 6B, used in the VLIW microprocessor 1 of the present invention shown in FIG. 5.

In FIG. 8, the 3-bit CC field 105, as the execution condition field, determines whether the execution of the operation__0 in the operation fields 106 and 107, the execution of the operation__1 and the operations of the operation fields 108, 109, and 110 are active or inactive based on the status of the execution control flags, F0 and F1 flag bits in the VLIW microprocessor 1. These execution control flags F0 and F1 will be explained later in detail.

The operation results are written into the registers, the memories and the flags only when the execution control flags indicate an active operation. When an operation is inactive, its results are not written into the registers, the memories, and the flags, so that the operation results are the same as these of a NOP (No Operation) instruction.

When the value CC of the execution condition field 105 is zero (CC=000), the operation is always active regardless of values of the operation control flags F0 and F1.

When CC=001, the operation is active only when the execution control flag F0=true. In this case, the state of the execution control flag F1 does not matter.

When CC=010, the operation is active only when F0=false. In this case, the status of the F1 flag does not matter.

When CC=011, the operation is active only when F1=true. In this case, the status of the F0 flag does not matter.

When CC=100, the operation is active only when F1=false. In this case, the status of the F0 flag does not matter.

When CC=101, the operation is active only when F0=true and F1=true.

When CC=110, the operation is active only when F0=true and F1=false.

When CC=111, the operation is undefined. The value CC=111 is not used in any instruction.

FIG. 9 is a diagram that gives a detailed explanation of the configuration of the operation fields such as the 28 bit short type operation fields 106, 107, and the 54 bit long type operation fields 108, 109, 110 (shown in FIGS. 6A and 6B) in the instruction formats 101 and 102 shown in FIGS. 6A and 6B.

In FIG. 9, each of the short formats 111, 112, 113, 114, 115, 116, and 117 comprises the 28-bit short type operation field 106 or 107. Each of the formats 118 and 109 comprises the 54 bit long-length type operation fields 108, 109 and 110.

As shown in FIG. 9, Format 111 (Short M) consists of field 120 (an 8-bit opcode field) designating the type of operation, the two fields 121 and 122 (two 6-bit register specifier fields Ra and Rb) each designates a register number, field 123 (a 6-bit register specifier field) for specifying a register number or an immediate value, and field 124 (a 2-bit operand identifier X) for indicating the type of data stored in the field 123. The format 111 is used for load-store instructions such as memory access operations with register indirect addressing modes.

As shown in FIG. 9, Format 112 consists of field 120 (an 8-bit opcode field) designating the type of operation, the two fields 121 and 122 (two 6-bit register specifier fields Ra and Rb) each designates a register number, field 123 (a 6-bit register specifier field) for indicating a register number or an immediate value and field 125 (a 1-bit operand identifier Y) for indicating the type of data stored in the field 123. This format 112 is used for instructions such as arithmetic operations, logic operations, shift operations, bit operations and so on.

Format 113 shown in FIG. 9 consists of field 120 (a 8-bit opcode field) designating the type of operation and field 126 (a 6-bit register specifier Rc field) for specifying a register number. This format 113 is used for jump instructions and branch instructions with an address specified in a register (Rc).

Format 114 shown in FIG. 9 consists of field 120 (an 8-bit opcode field) designating the type of operation and field 127, an 18-bit displacement. This format 114 is used for jump instructions and branch instructions with an immediate 18-bit displacement.

Format 115 Shown in FIG. 9 consists of field 120 (an 8-bit opcode field) for designating the type of operation, field 121 (a 6-bit register specifier Ra field) for designating a register number, field 128 for designating a register number or a 12-bit immediate value, field 129 for indicating whether the field 128 stores a register number or an immediate value, and field 130 for indicating whether a conditional jump operation or a conditional branch operation is performed based on the contents (zero decision) of the register specified in field 121. This format 115 is used for conditional jump instructions and conditional branch instructions.

Format 116 Shown in FIG. 9 consists of field 120 (an 8-bit opcode field) for designating the type of operation, field 121 (a 6-bit register specifier Ra field) for designating a register number, field 128 for designating a register number or a 12-bit immediate value and field 129 (a 1-bit operand identifier Y field) for specifying whether the content in field 128 is a register number or an immediate value. This format 116 is used for conditional jump instructions, conditional branch instructions, and repeat instructions.

Format 117 shown in FIG. 9 consists of field 120 (an 8-bit opcode field) for designating the type of operation, field 128 for designating a register number or a 12-bit immediate value, field 129 (a 1-bit operand identifier Y field) for indicating whether the content in field 128 is a register number or an immediate value and field 131 (a 6-bit displacement field ct: 6) used for delayed instructions. This format 117 is used for delayed jump instructions, and delayed branch instructions.

Format 118 (Long) consists of field 120 for designating the type of operation, the two fields 121 and 122 for designating register numbers and field 132 for designating a 32-bit immediate value. This format 118 is used for all instructions that take a 32-bit immediate operand such as complicated arithmetic operations, arithmetic operations using a large immediate value, memory access operation of register relative indirect addressing with a large displacement, branch instructions with a large displacement and jump instructions to absolute addresses.

Format 119 shown in FIG. 9 consists of field 120 (an 8-bit opcode field) for designating the type of operation, two fields 121 and 122 for designating register numbers, field 132 for designating a 32 bit immediate value, and field 133 for indicating either a conditional jump operation or a conditional branch operation is performed based on the content in fields 132 and 133 of a zero decision. This format 119 is used for condition jump instructions and condition branch instructions with a large branch displacement.

Figure 10B:
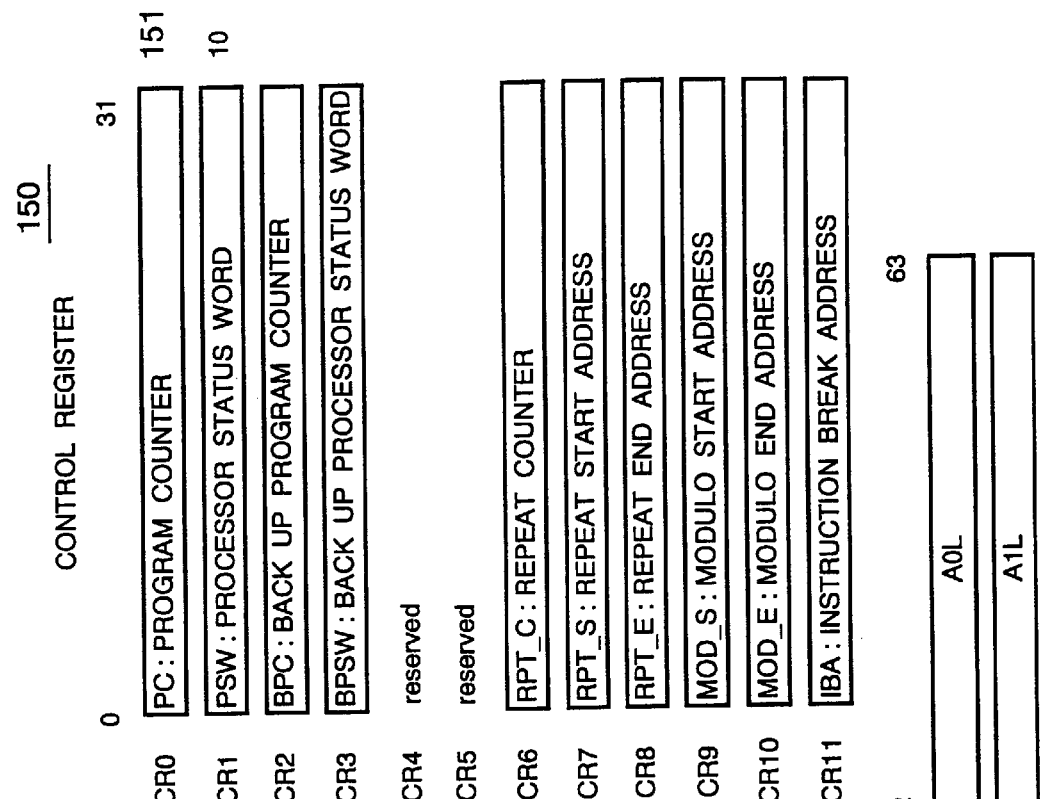
Figure 10A:
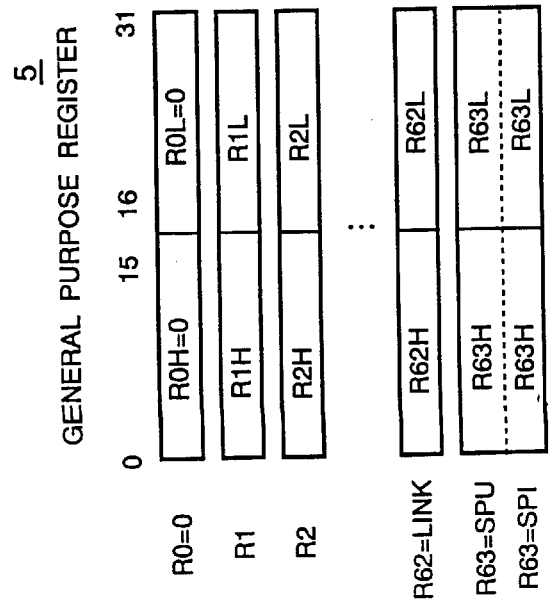
Figure 10C:
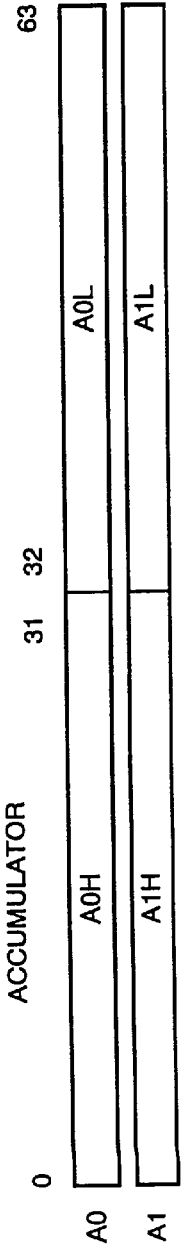

FIGS. 10A, 10B, and 10C are explanation diagrams showing the configuration of registers incorporated in the VLIW microprocessor 1 according to the present invention shown in FIG. 5.

The VLIW microprocessor 1 shown in FIG. 5 comprises the general purpose register file 5 including sixty-four 32-bit general purpose registers shown in FIG. 10A, twelve control registers 150 shown in FIG. 10B and two accumulators 18 shown in FIG. 10C. The value in the general purpose register (R0) 140 in the general purpose register file 5 is always zero. Therefore writing data into the register (R0) 140 has no effect.

The general purpose register (R63) is the stack pointer (SPU, SPI) operating, which serves as the user stack pointer (SPU) 141 or the interrupt stack pointer (SPI) 142 depending on the value of the SM field in the processor status word (PSW) 10 as will be explained later with reference to FIG. 11.

The control registers 150 comprise a program counter 151, the PSW 10 and other dedicated registers.

In several operations that use format 112, the upper 16 bits and the lower 16 bits in each of the 64 general purpose registers 5 can be used independently.

Figure 11:
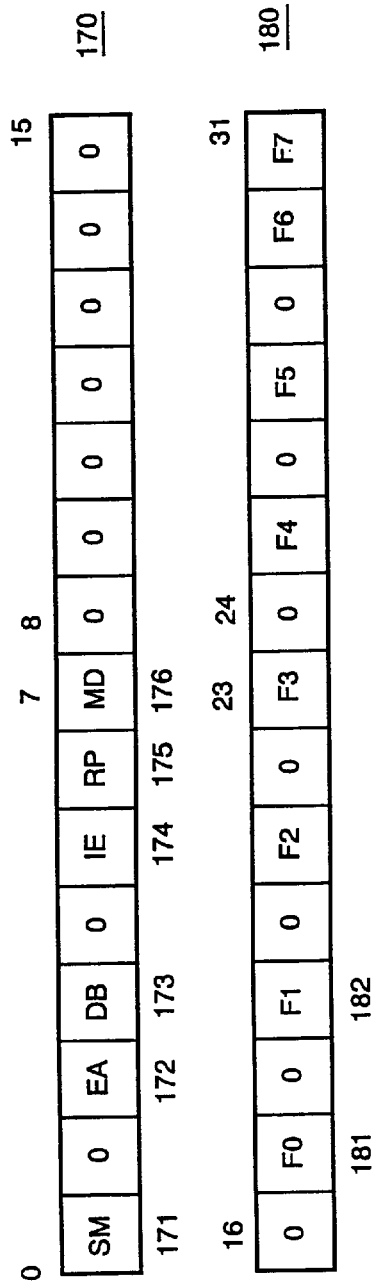
FIG. 11 is an explanation diagram showing a configuration of a register in the VLIW microprocessor of the present invention shown in FIG. 5.

FIG. 11 is a diagram showing detailed contents of the processor status word (PSW) 10 in the VLIW microprocessor 1 according to the present invention shown in FIG. 5.

As shown in FIG. 11, the upper 16 bits 170 in the PSW 10 includes the SM field 171 for switching the stack pointer, the EA field 172 for showing a detection of a software debugger trap (SDBT), the DB field 173 for enabling or disabling the SDBT, the IE field 174 for enabling or disabling interrupts, the RP field 175 for activating a repeat operation and the MD field 176 for enabling or disabling of modulo addressing.

The lower 16 bit field is a flag field 180. The flag field 180 includes 8 flags. The F0 flag field 181 and F1 flag 182 (execution control flags) are used in conjunction to the CC bits to decide whether each operation being executed by the CPU is active or inactive. The value of each flag is changed depending on results of comparison operations and flag logical operations, according to initialization operations for these flags, or by writing a register value into the flag field 180 in flag writing operations. Contents in the flag field 180 can be read out by flag-value readout operation.

Hereinafter, the instruction list used in the VLIW microprocessor 1 shown in FIG. 5 will be described.

A. Microprocessor Controlling Function Instructions

A-1. Load/Store instructions

LDB :Load one byte to a register with sign extension
LDBU :Load one byte to a register with zero extension
LDH :Load one half-word to a register with sign extension
LDHH :Load one half-word to a register high
LDHU :Load one half-word to a register with zero extension
LDW :Load one word to a register
LD2W :Load two words to registers
LD4BH :Load four bytes to four half-words in two registers with sign extension
LD4BHU :Load four bytes to four half-words in two registers with zero extension
LD2H :Load two half-words to two words in two registers with sign extension
STB :Store one byte from a register
STH :Store one half-word from a register
STHH :Store one half-word from a register high
STW :Store one word from a register
ST2W :Store two words from two registers
ST4HB :Store four bytes from four half-words from two registers
ST2H :Store two half-words from two registers
MODDEC :Decrement a register value by a 5-bit immediate value
MODINC :Increment a register value by a 5-bit immediate value A-2. Transfer instructions MVFSYS :Move a control register to a general purpose register
MVTSYS :Move a general purpose register to a control register
MVFACC :Move a word from an accumulator
MVTACC :Move two general purpose registers to an accumulator A-3. Compare instructions
CMPcc :Compare
  cc=EQ(equal), NE (not equal), GT(greater than),
  GE(greater than or equal), LT(less than),
  LE(less than or equal), PS(both positive),
  NG(both negative)
CMPcc :Compare unsigned
  cc=GT, GE, LT, LE
A-4. Maximum/Minimum instructions reserved
A-5. Arithmetic operation instructions
ABS :Absolute
ADD :Add
ADDC :Add with carry
ADDHppp :Add half-word
  ppp=LLL(register lower, register lower, register lower),
    LLH(register lower, register lower, register higher),
    LHL, LHH, HLL, HLH, HHL, HHH
ADDS :Add register Rb with the sign of the third operand
ADDS2H :Add sign to two half-words
ADD2H :Add two pairs of half-words
AVG :Average with rounding towards positive infinity
AVG2H :Average two pairs of half-words with rounding towards positive infinity
JOINpp :Join two half-words
  pp=LL, LH, HL, HH
SUB :Subtract
SUBB :Subtract with borrow
SUBHppp :Subtract half-word
  ppp=LLL, LLH, LHL, LHH, HLL, HLH, HHL, HHH
SUB2H :Subtract two pairs of half-words
  A-6. Logical operation instructions
AND :bitwise logical AND
OR :bitwise logical OR
NOT :bitwise logical NOT
XOR :bitwise logical exclusive OR
ANDFG :logical AND flags
ORFG :logical OR flags
NOTFG :logical NOT a flag
XORFG :logical exclusive OR flags
  A-7. Shift operation instructions
SRA :Shift right arithmetic
SRA2H :Shift right arithmetic two half-words
SRC :Shift right concatenated registers
SRL :Shift right logical
SRL2H :Shift right logical two half-words
ROT :Rotate right
ROT2H :Rotate right two half-words
  A-8. Bit operation instructions
BCLR :Clear a bit
BNOT :Invert a bit
BSET :Set a bit
BTST :Test a bit
  A-9. Branch instructions
BRA :Branch
BRATZR :Branch if zero
BRATNZ :Branch if not zero
BSR :Branch to subroutine
BSRTZR :Branch to subroutine if zero
BSRTNZ :Branch to subroutine if not zero
JMP :Jump
JMPTZR :Jump if zero
JMPTNZ :Jump if not zero
JSR :Jump to subroutine
JSRTZR :Jump to subroutine if zero
JSRTNZ :Jump to subroutine if not zero
NOP :No Operation A-10. OS-related instructions
TRAP :Trap
REIT :Return from exception, interrupts and traps
B. DSP Function Instructions
  B-1. Arithmetic operation instructions
MUL :Multiply
MULX :Multiply with extended precision
MULXS :Multiply and shift to the right by one with extended precision
MULX2H :Multiply two pairs of half-words with extended precision
MULHXpp :Multiply two half-words with extended precision
  pp=LL, LH, HL, HH
MUL2H :Multiply two pairs of half-words
MACa :Multiply and add
  a (designates which accumulator to use)=0, 1
MACSa :Multiply, shift to the right by one and add
  a=0, 1
MSUBa :Multiply and subtract
  a=0, 1
MSUBSa :Multiply, shift to the right by one and subtract
  a=0, 1
  B-2. Repeat instructions
REPEAT :Repeat a block of instructions
REPEATI :Repeat a block of instructions with immediate repeat count
Pipeline Operation FIG. 12 is an explanation diagram showing a pipeline operation of execution (FM=00) of two instructions executed in parallel in the VLIW microprocessor 1 of the present invention shown in FIG. 5. The pipeline comprises an instruction fetch (F) stage 191, a decode/address operation (D/A) stage 192, an execution memory access (E/M) stage 193, and a write back (W) stage 194.

When the two instructions are executed in parallel, both the pipeline 190 executed by the memory access unit 3 and the pipeline 195, indicated by the oblique line shown in FIG. 12, executed by the integer operation unit 4 are executed simultaneously in parallel.

FIG. 13 is an explanation diagram showing a four stage pipeline operation in which processes required for one instruction execution are performed in four pipeline stages in the VLIW microprocessor 1 of the present invention shown in FIG. 5.

First, an instruction fetch operation is executed at F stage, and then a decode operation of the fetched instruction is performed at D/A stage. A readout operation to the general purpose register file 5 is executed at the first half of D/A stage, an address calculation operation is executed at the latter half of D/A stage. In E/M stage, an arithmetic operation and a memory access operation are performed. Then, a write back operation to the general purpose register file 5 is executed at the latter half of W stage. In general, the pipeline of one instruction requires these operations described show. As shown in the lower part of each stage in the pipeline shown in FIG. 13, the processing at the first half (I1, D1, E1, and W1) and at the latter half (I2, D2, E2, and W2) of each of the four stages, F stage, D/A stage, E/M stage, and W stage are executed in synchronization with the high level part and the low level part of a clock signal, respectively. The first half and the latter half of the F stage are called to as I1 period processing and I2 period processing, respectively. The first half and the latter half of the D stage are called to as D1 period processing and D2 period processing, respectively. The first half and the latter half of the E stage are called to as E1 period processing and E2 period processing, respectively. The first half and the latter half of the W stage are called to as W1 period processing and W2 period processing, respectively.

Detailed Block Diagram of the VLIW Microprocessor of the Present Invention

Next, the detailed configuration of the VLIW microprocessor 1 of the present invention will be explained.

Figure 14A:
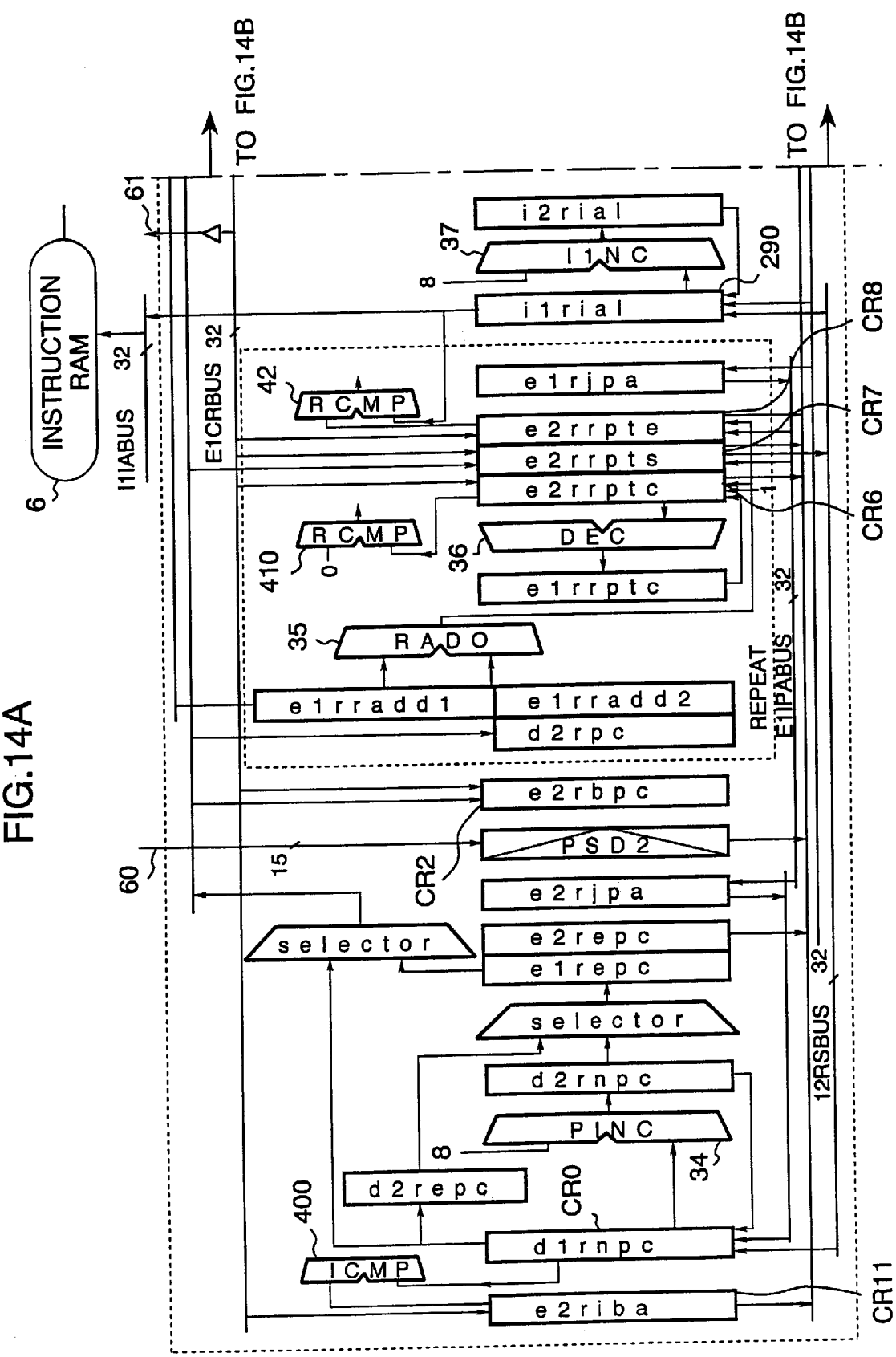
Figure 14B:
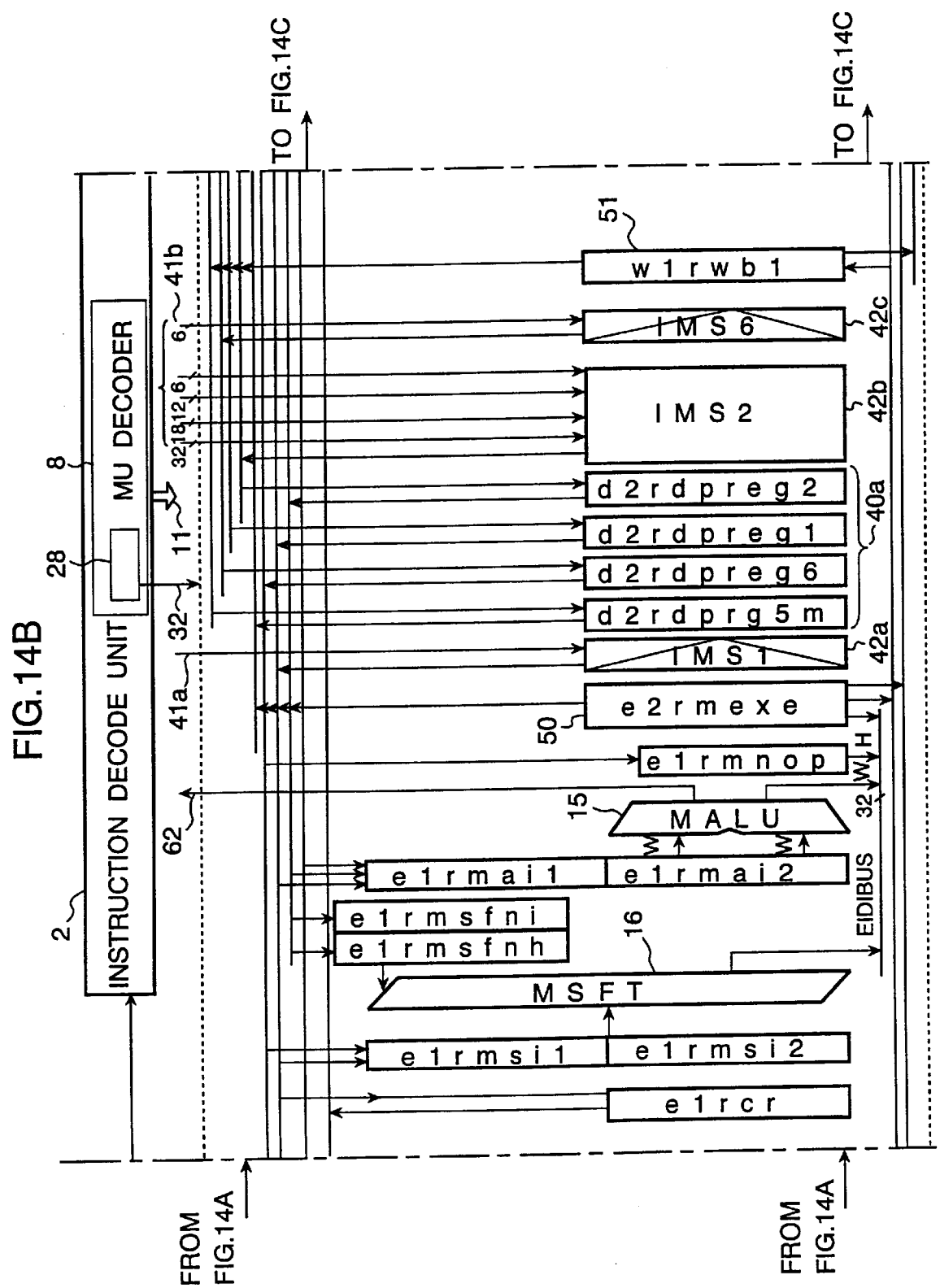
Figure 14D:
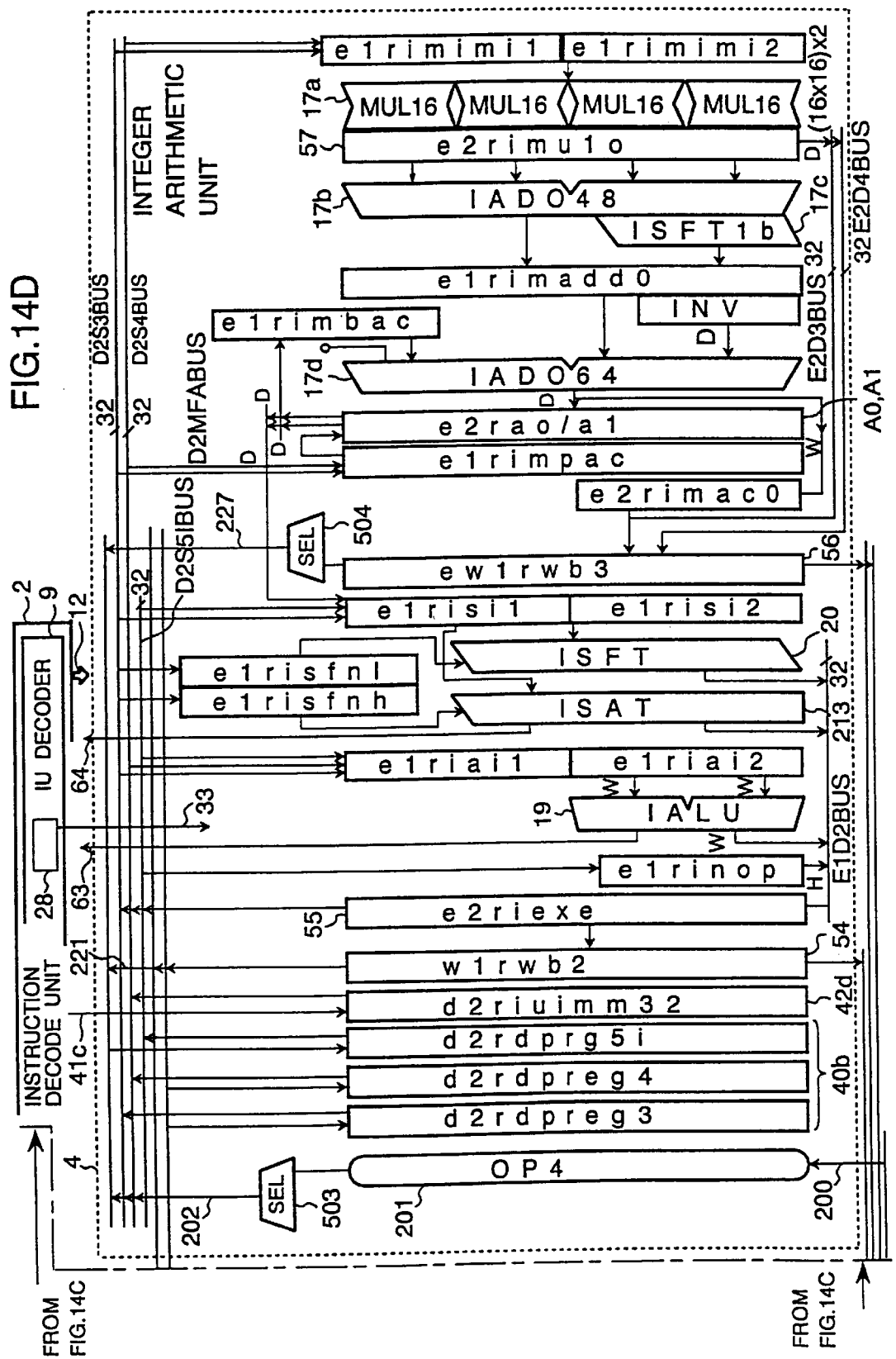

FIGS. 14A, 14B, 14C, and 14D are diagrams mainly showing the detailed configuration of the memory access unit 3 and the integer operation unit 4 in the VLIW microprocessor 1 of the present invention shown in FIG. 5. In FIGS. 14A, 14B, 14C, and 14C, the same reference numbers are also used for the same components incorporated in the VLIW microprocessor 1 of the present invention, as shown in FIG. 5.

The memory access unit 3, having the configuration shown in FIG. 5, for example, comprises the ALU 15, the shifter 16, and other operation units for performing memory control operation, program counter (PC) control, operation control and the like. The reference number 290 designates the instruction address register for storing an address used for accessing the instruction RAM 6 when instruction fetch operation is performed. The reference number 300 denotes a control section for arranging the stored data item used when the memory store operation is executed, 330 indicates an incrementer for performing a post-increment/decrement addressing when a load instruction or a store instruction is executed. The reference number 320 designates an adder for calculating an address calculation when a load/store instruction and a branch instruction is executed. The reference number 50 designates a register for storing the result of the operation of the ALU 15, and the shifter 16.

The reference characters CR0-CR11 designate the control register 150 shown in FIGS. 10A, 10B, 10C and 10D, 34 denotes an incrementer for incrementing the content of the program counter (PC) CR0 in the control register 150, 35 indicates an adder for calculating the value of the repeat count register CR6 and the value of the repeat end-address register CR8.

The reference number 36 designates a decrementer for decrementing the value of the repeat count register CR6, 37 indicates an incrementer for incrementing the value of the instruction address register 290, and 400 designates a 32-bit comparator for comparing the value of the instruction break address register CR11 with the value of the program counter CR0 and for outputting an agreement signal when both values are same. The reference number 410 designates a 32-bit comparator for outputting an effective signal indicating the effective state when the value of the repeat count register CR6 is not less than zero. The reference number 42 designates a 32-bit comparator for comparing the value of the repeat end-address register CR8 with the value of the instruction address register 290 and for outputting the agreement signal when both values are same.

The reference number 43 designates a 32-bit comparator for comparing the value of the modulo end-address register CR10 with the value of the incrementer 310 and for outputting the agreement signal when both values are same. The reference number 44 denotes a 32-bit comparator for outputting an effective signal indicating the effective state when the value on the D1S6bus is zero.

The integer operation unit 4 has the units 17a to 17d forming the multiplier 17 shown in FIG. 5, the ALU 19, the shifter 20, and an operation unit 213 for a saturation operation which is not shown in FIG. 5. The reference characters A0 and A1 designate the accumulator, as the component element 18 shown in FIG. 5, for accumulating the sum of product operation and the like.

The reference number 55 indicates a register for storing the results of the ALU 19, the shifter 20, and a saturation operation unit. The S1 bus, S2 bus, S3 bus, S4 bus, 5S bus, and S6 bus shown in FIG. 5 correspond to the D1S1BUS, D1S2BUS, D1S3BUS, D1S4BUS, D1S5BUS, AND D1S6BUS, respectively. The reference character D1 in D1S1BUS shows that the bus is driven during the D1 period in D stage shown in FIG. 13. Buses having the head character "D1" in the reference character of each bus are referenced to as "D1 synchronous bus group". Further, W1 bus, W2 bus, W3E bus, and W30 buses shown in FIG. 5 correspond to W1W1BUS, W1W2BUS, W1W3EBUS, W1W3OBUS shown in FIGS. 14A to 14D. The reference character W1 in W1W1BUS shows that the bus is driven during the W1 period in W stage shown in FIG. 13. Buses having the head character "W1" in the reference character of each bus are referenced to as "W1 synchronous bus group". The latches 40a and 40b change this timing.

The reference characters 41a, 41b, and 41c designate immediate values outputted from the instruction decode section. These values are provided to the D1 and D2 synchronous bus group through the bus drivers 41a, 42b, 42c, and 42d. The register value for storing the value of the control register and the value of the operation unit is outputted during the E2 period through each of the E2D1BUS, E2D3BUS, and E2D4BUS. The reference number 51 designates a write back register for outputting the data on the E2D1BUS to the W1W1BUS. The reference number 53 denotes a register for outputting the value of the load data item to the W1W3EBUS and W1W3OBUS.

The reference number 54 designates a write back register for outputting the value of the operation result storing register 55 to W1W2BUS. The reference number 60 designates a path through which the value of the PSW register in the instruction decode unit is read out to the E2D1BUS. The reference number 61 denotes a path through which the value of E1CRBUS is written into the PSW register in the instruction decode unit 2. The reference number 62 indicates a flag propagation path to be outputted to the instruction decode unit 2 from the ALU 15. The reference number 63 indicates a flag propagation path to be outputted to the instruction decode unit from the ALU 19. The reference number 64 indicates a flag propagation path to be outputted to the instruction decode unit from the saturation operation unit 213.

The reference number 201 designates a sign extension section for expanding a sign of the value on the load data bus M2ODBUS. The reference number 200 designates a propagation path to be received the value on the load data bus M2ODBUS into the sign extension section 201. The reference number 202 designates a path for outputting the value of the sign extension section 201 onto the D2 synchronous bus group. The reference number 211 denotes a register for receiving the value of W1W3EBUS and W1W3OBUS to which the value of the write back register 55 is outputted. The reference number 210 designates a path for receiving values of W1W3EBUS and W1W3OBUS and for writing them to the register 211.

The reference number 212 denotes a path for outputting the value of the register 211 to the D2 synchronous bus group. The reference number 225 indicates a path for outputting the value of the sign extension section 330 to the D2 synchronous bus group.

The reference number 226 designates a path for outputting the value of the write back register 53 to the D1 synchronous bus group. The reference number 221 denotes a bypath (data transfer path) for outputting the value of the write back register 54 to the D1 synchronous bus group. The reference numbers 500, 501, 502, 503, and 504 designate selectors (selection means) for selecting one word in a double word data item.

Hereinafter, the cross-bypath operation in the VLIW microprocessor 1 as the first embodiment of the present invention will now be explained.

As shown in the pipeline in FIG. 13, the data readout operation is executed during the D1 period in D stage. In this case, the writing operation to the general purpose register file 5 is executed during the W2 period in W stage. Thereby, for example, when an instruction to be executed immediately following a preceding instruction will execute the readout operation from the destination register into which the data item has been written during the execution of the preceding instruction, the data item as the execution result of this preceding instruction must be transferred to the first half stage of a pipeline. This data relationship is called a data hazard or data interference. Thus, the data hazards will happen between continuous three instructions based on the timing of a data writing to the general purpose register file 5.

The bypaths used for avoiding the occurrences of the data hazards are called as cross-bypaths. These cross-bypaths correspond to the bypaths 21 to 25, 40 and 41 in the VLIW microprocessor 1, as shown in FIG. 5.

In the VLIW microprocessor 1 of the first embodiment, the cross-bypath 21 is formed between the memory access unit 3 and the integer operation unit 4 and the tri-state buffer 30 is also incorporated on the way of this cross-bypath 21. The tri-state buffer 30 is operated based on the control of the bypath processing control circuit 28 incorporated in the IU decoder 9. That is, the data transfer operation between the memory access unit 3 and the integer operation unit 4 is controlled by the bypath processing control circuit 28 through the cross-bypath 28. Thereby, it is possible to avoid the occurrence of a data hazard that happens between the memory access unit 3 and the integer operation unit 4 during the execution of each instruction. This causes an increase in the operation efficiency of the VLIW microprocessor of the present invention.

Next, the operation of the VLIW microprocessor of the first embodiment will be explained.

Figure 15:
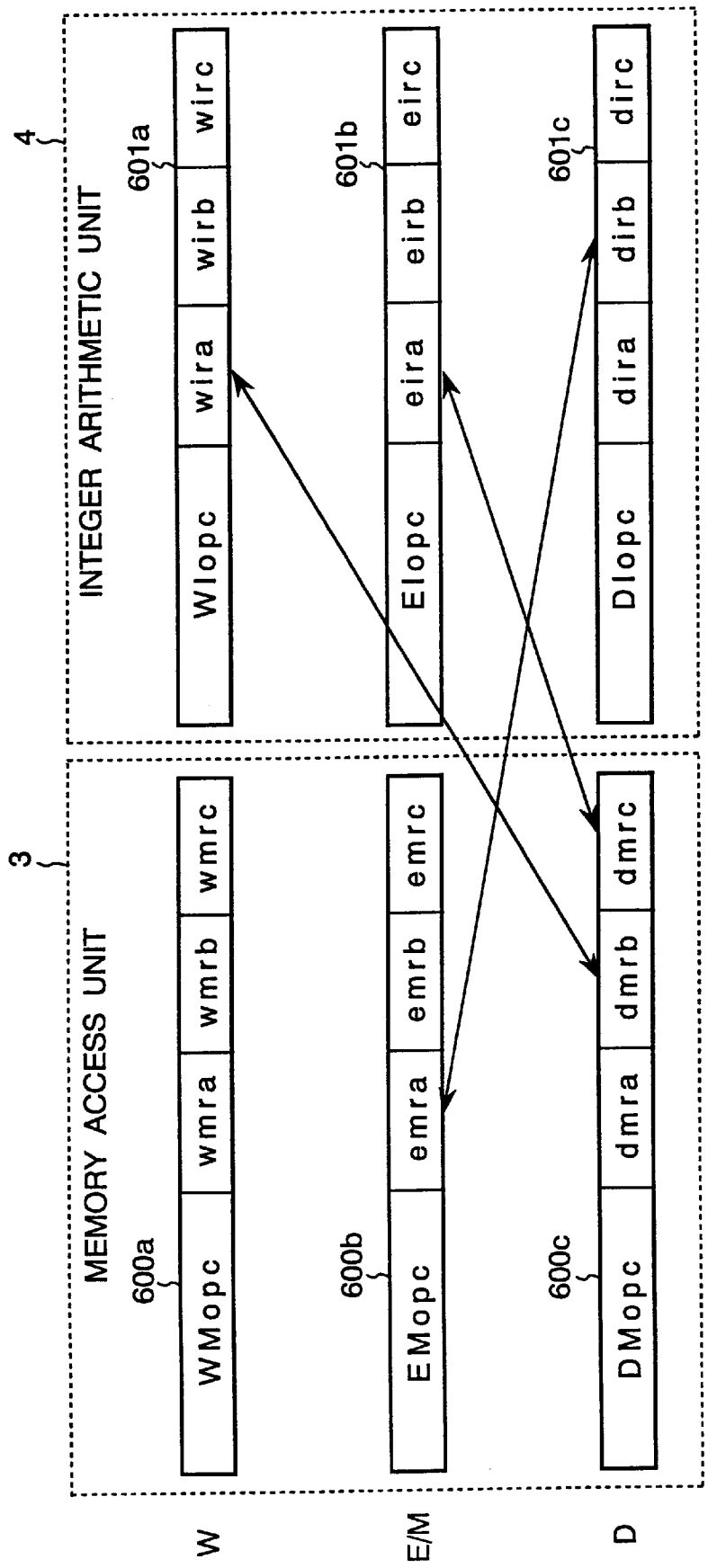
FIG. 15 is an explanation diagram showing data hazard or data interference between instruction codes executed by a plurality of execution units.

FIG. 15 is an explanation diagram showing a data hazard or data interference between instruction codes executed caused by a plurality of the execution units. In FIG. 15, the reference characters 600a, 600b, and 600c designate instruction codes executed in W stage, E/M stage, D stage executed in the memory access unit 3. The reference characters 601a, 601b, and 601c designate instruction codes to be executed in W stage, E/M stage, and D stage in the integer operation unit 4, respectively. The four fields in each instruction code designates an opcode, a destination register designation field, and two source register designation fields as viewed from the front field.

The front two characters in each field in each instruction code indicate the type of stage and the operation executed in each operation unit. For example, "the character "WM" indicates the execution in the memory access unit 3 in W stage.

As shown in FIG. 15, there are data hazards caused among the instruction codes 600a, 600b, and 600c to be executed in the memory access unit 3 and caused among the instruction codes 601a, 601b, and 601c to be executed in the integer operation unit 4, as data hazards caused among the continuous three instructions to be executed continuously. In the VLIW microprocessor of the first embodiment, as shown by arrows in FIG. 15, data items are directly transferred to target execution units such as the memory access unit 3 and the integer operation unit 4 through the cross-bypath 21 as the bypath in order to avoid the occurrence of the data hazard between the instruction to be executed by the memory access unit 3 and the instruction to be executed by the integer operation unit 4. FIG. 15 shows the data hazards that will happen between the source register designation fields dmrb and dmrc in the instruction code executed by the memory access unit 3 and the destination designation fields wira and eira in the instruction code to be executed by the integer operation unit 4. In addition, FIG. 15 also shows the data hazard that will happen between the source register designation field dirb in the instruction code to be executed at D stage in the integer operation unit 4 and the destination designation field emra to be executed at E/M stage in the memory access unit 3.

Figure 16:
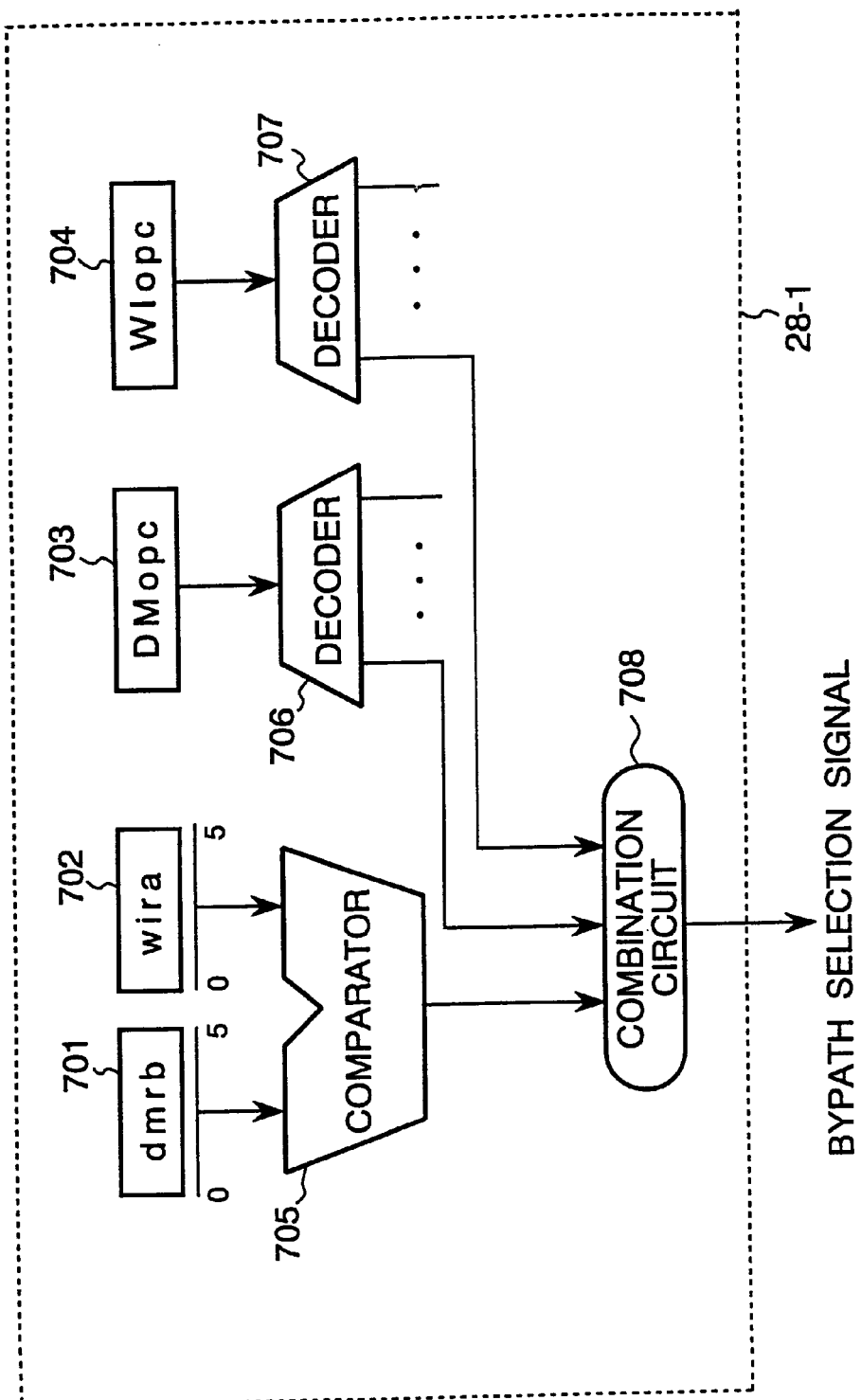
FIG. 16 is a block diagram of a control circuit for generating and outputting control signals to select cross-bypaths in the VLIW microprocessor of the first embodiment of the present invention.

FIG. 16 is a block diagram of a control circuit 18-1 for generating and outputting bypath control signals to select one of cross-bypaths through which data items are directly transferred to a target unit. In FIG. 16, the reference number 701 designates a register for storing the value of the source register designation field dmrb [0:5], 702 denotes a register for storing the value of the destination register designation field wira [0:5], 703 denotes a register for storing an opcode DMopc, and 704 indicates a register for storing an opcode WIopc.

The reference number 705 designates a comparator for comparing the source register designation field stored in the register 701 with the destination designation field stored in the register 702, and for transferring a agreement signal when both values stored in the registers 701 and 702 are same. The reference number 706 designates a decode circuit for decoding the opcode in the register 703 and for generating an instruction indication signal to indicate the type of the instruction that is currently executing in D stage in the memory access unit 3. The reference number 707 designates a decode circuit for decoding the opcode in the register 704 and for generating an instruction indication signal to indicate the type of the instruction that is currently executing in W stage in the integer operation unit 4. The reference number 708 indicates a combination circuit for generating a bypath selection signal when the signal values transferred from the comparator 705 and the decode circuits 706 and 707 are same based on the agreement signal from the comparator 705 and the instruction indication signal transferred from the decode circuits 706 and 707.

The control circuit 28-1 generates the bypath selection signal and transfers it to the tri-state buffers 29 and 30 located in each cross-bypaths 21 to 23. The tri-state buffer 30 receives this bypath selection signal and then access the cross-bypath connected between the memory access unit 3 and the integer operation unit 4. Thereby, the data item is directly transferred between the memory access unit 3 and the integer operation unit 4.

Figure 17:
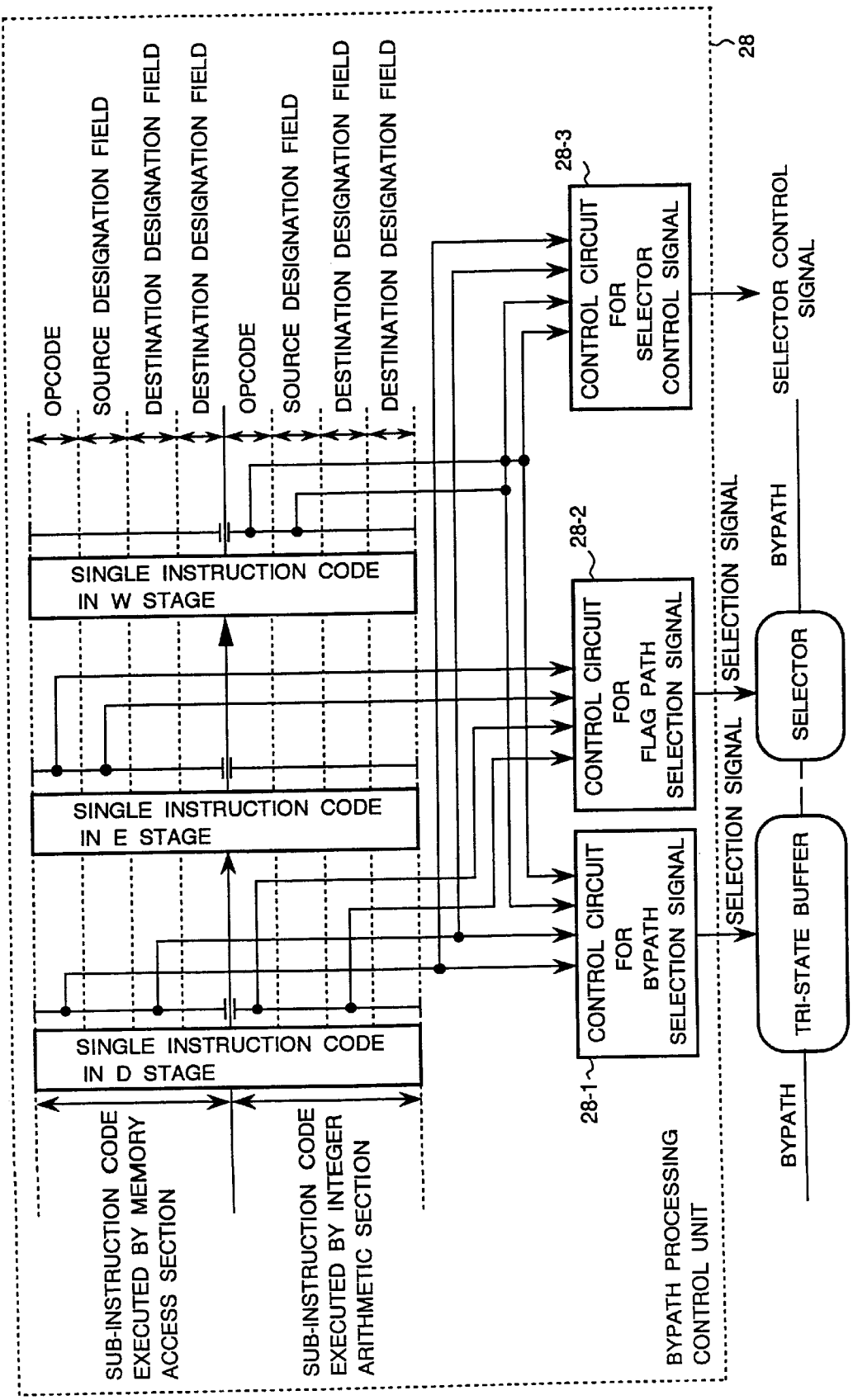
FIG. 17 is a block diagram showing a configuration of a bypath processing control circuit including control circuits shown in FIG. 16 and FIG. 28, which is incorporated in the instruction decoder in the VLIW microprocessor of the present invention shown in FIG. 5.
Figure 27:
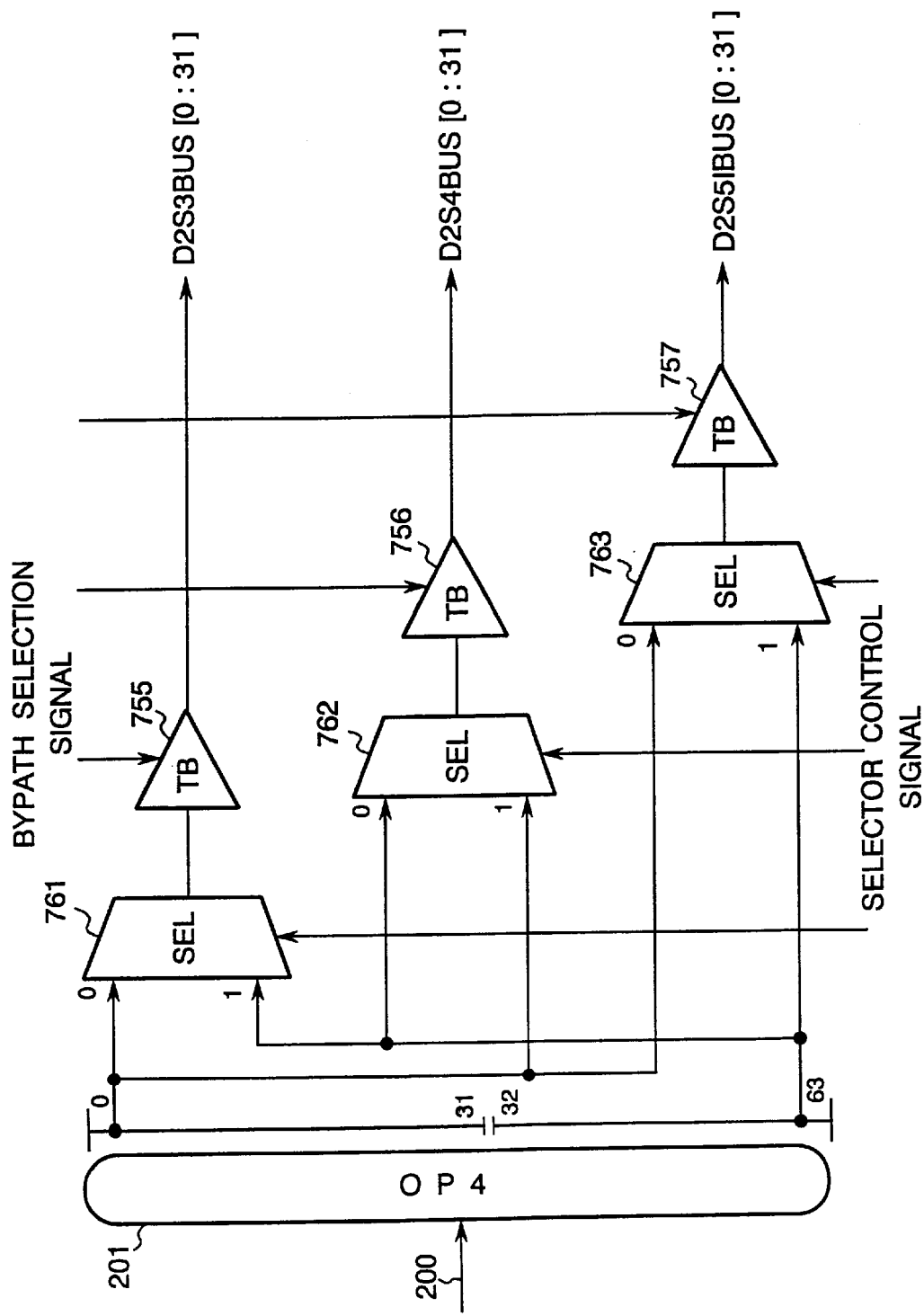
FIG. 27 is a block diagram showing a detailed configuration of a bypath for directly transferring bypath load data in the VLIW microprocessor of the seventh embodiment according to the present invention.

FIG. 17 is a block diagram showing the configuration of the bypath processing control circuit 28 including the control circuit 28-1 for generating the bypath selection signal shown in FIG. 16 and FIG. 27, which is incorporated in the instruction decoder in the VLIW microprocessor 1 of the present invention shown in FIG. 5. In FIG. 17, the reference number 28-1 designates the control circuit having the configuration shown in FIG. 16 for generating and transferring bypath selection signals by using predetermined data items in sub-instruction codes to be executed in the memory access unit 3 and the integer operation unit 4. The reference number 28-2 indicate the control circuit having the configuration shown in FIG. 16 for generating and transferring flag path selection signals by using predetermined data items in sub-instruction codes to be executed in the memory access unit 3 and the integer operation unit 4. The reference number 28-3 denotes the selector control circuit for generating and transferring selector control signals by using predetermined data items in sub-instruction codes to be executed in the memory access unit 3 and the integer operation unit 4.

As has been described above, the bypath processing control circuit 28 is incorporated in each of the MU decoder 8 and the IU decoder 9.

As described above, according to the VLIW microprocessor 1 of the first embodiment, the cross-bypath is incorporated between the memory access unit 3 and the integer operation unit 4 where data hazard will happen shown in FIG. 15. Thereby, the data transfer operation between the operation units is directly executed through the cross-bypaths under the control of the control circuit having the configuration and the tri-state buffers shown in FIGS. 16 and 17. For example, even if a data hazard happens, data can be directly transferred between the operation units through the cross-bypaths. Therefore it becomes possible to execute instructions efficiently while keeping the data items correct without penalties such as stop of pipeline operations.

Second Embodiment

Figure 18:
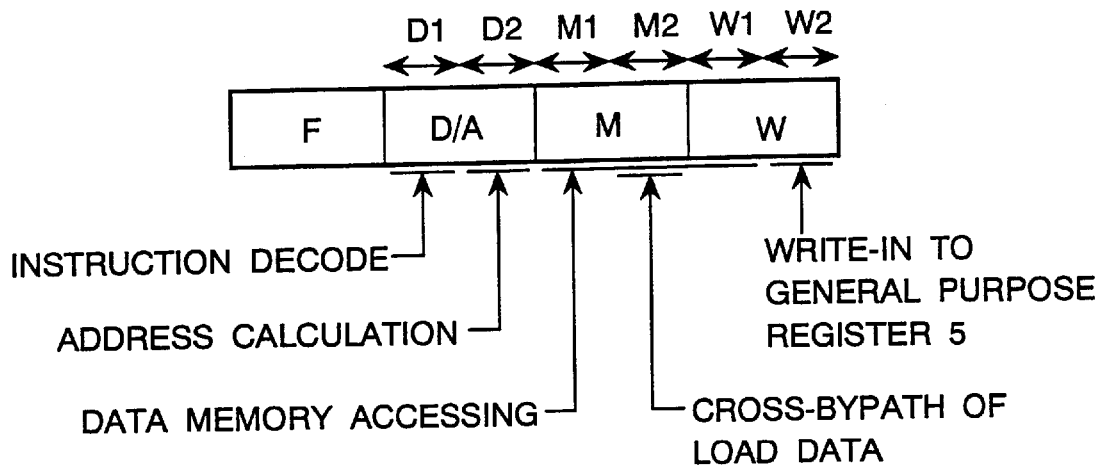
FIG. 18 is an explanation diagram of the pipeline showing the execution timing of a load instruction executed only by a memory access unit in the VLIW microprocessor of the second embodiment according to the present invention.

FIG. 18 is an explanation diagram of a pipeline showing the execution timing of a load sub-instruction executed only by the memory access unit 3 in the VLIW microprocessor of the second embodiment. The configuration of the VLIW microprocessor of the second embodiment has the same configuration of the first embodiment shown in FIGS. 5, and 14A to 14D. Therefore the explanation is omitted here.

The VLIW microprocessor of the second embodiment has a dedicated bypath (a data transfer path) between different pipelines of load sub-instructions. Thereby, the VLIW microprocessor is capable of avoiding occurrences of data hazards and of executing instructions efficiently while keeping the data items correct without penalties such as stop of pipeline operations.

Next, the operation of the VLIW microprocessor of the second embodiment will be explained.

In general, load sub-instructions are executed only by the memory access unit 3. The data item fetched in the operation of the load sub-instruction executed by the memory access unit 3 is directly transferred to the integer operation unit 4 through the cross-bypath. As shown in FIG. 18, the execution timing of the load sub-instruction executed by the memory access unit 3 is follows. The sub-instruction is decoded during the D1 period in D stage; Address calculation for data the memory calculation is executed during the D2 period in D stage; the data memory is accessed in M stage; loaded data items are written into the general purpose register file 5 during the W2 period in W stage; and the cross-bypath operation is performed during the M2 period in M stage.

Figure 19:
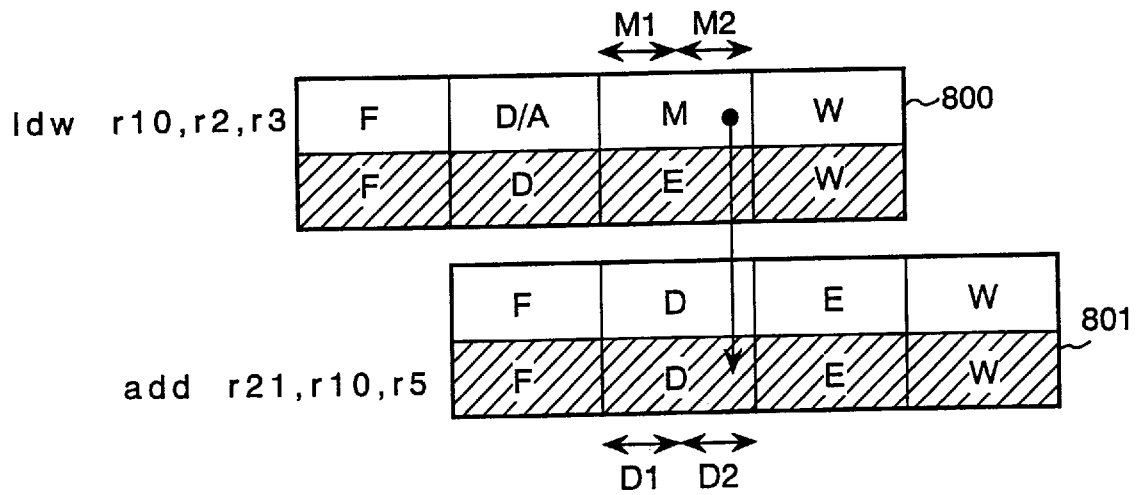
FIG. 19 is an explanation diagram showing a timing of a cross-bypath of load data by using pipeline in the VLIW microprocessor of the third embodiment according to the present invention.

FIG. 19 is an explanation diagram showing a timing of the cross-bypath of a load data item in a pipeline. The part shown by the white color section in FIG. 19 is the pipeline executed in the memory access unit 3. The part shown by the slant line section in FIG. 19 is the pipeline executed by the integer operation unit 4.

The reference number 800 designates the pipeline of the load sub-instruction (1d2w r10, r2, r3) executed by the memory access unit 3. The load sub-instruction is executed in the timing shown by the pipeline diagram shown in FIG. 18. The reference number 801 denotes the pipeline of the add instruction (add r21, r10, r5) executed by the integer operation unit 4. This pipeline receives data directly transferred from the memory access unit 3 executing the load sub-instruction through the cross-bypath. In this case, the loaded data item, to be written into the general purpose register file 5, is directly transferred from the M2 period in M stage of the pipeline 800 to the D2 period in D stage of the pipeline 801 through the cross-bypath.

Next, the explanation of the cross-bypath operation will be described by using the block diagrams showing the detailed configuration of the VLIW microprocessor 1, as shown in FIGS. 14A to 14D.

In FIGS. 14A to 14D, the bypath used for the load data is formed by using the bypath 200, the sign extension section (OP4) 201, the selector 503, and the bypath 202.

The memory access unit 3 performs the memory access operation at M stage of the pipeline 800. At the M1 period in M stage, the address to be used for data memory access is transferred to the address bus M1OABUS. The data RAM 7 outputs the load data item to the bus, M2ODBUS during the M2 period in M stage. The data item on the load data bus M2ODBUS is inputted to the sign extension section 201 through the bypath 200. The data item in the sign extension section 201 is outputted to the D2 synchronous bus group in the integer operation unit 4 through the cross-bypath 202. The bypath processing control circuit 28 controls the tri-stage buffer 30 in order to execute the output timing. This output timing is corresponding to the timing at D stage in the pipeline 800. This means that the data bypath processing from M stage in the pipeline 800 to D stage in the pipeline 801 has been executed.

The bypath processing control circuit 28 compares the value of the destination register designation field of a load sub-instruction of one pipeline with the value of the source register designation field in a load sub-instruction to be used by another pipeline, and then accesses the cross-bypath based on the comparison result.

As described above, according to the second embodiment of the present invention, the bypath is incorporated between a plurality of operation units such as the memory access unit 3, the integer operation unit, and the like, where it is predicted that a data hazard such as data interference caused between pipelines of load sub-instructions happens. The data transfer between the plurality of operation units is executed through the cross-bypath under the control of the control circuit and the tri-state buffer having the configuration shown in FIGS. 16 and 17. Thereby, even if the data hazard is caused between the pipelines of load instructions executed by the operation units, it can be executed to directly transfer data between the operation units through the cross-bypath. Thus, the VLIW microprocessor of the second embodiment is capable of avoiding occurrences of data hazards and of executing instructions efficiently while keeping data correct without penalties such as stopping of the pipeline operations.

Third Embodiment

Figure 20:
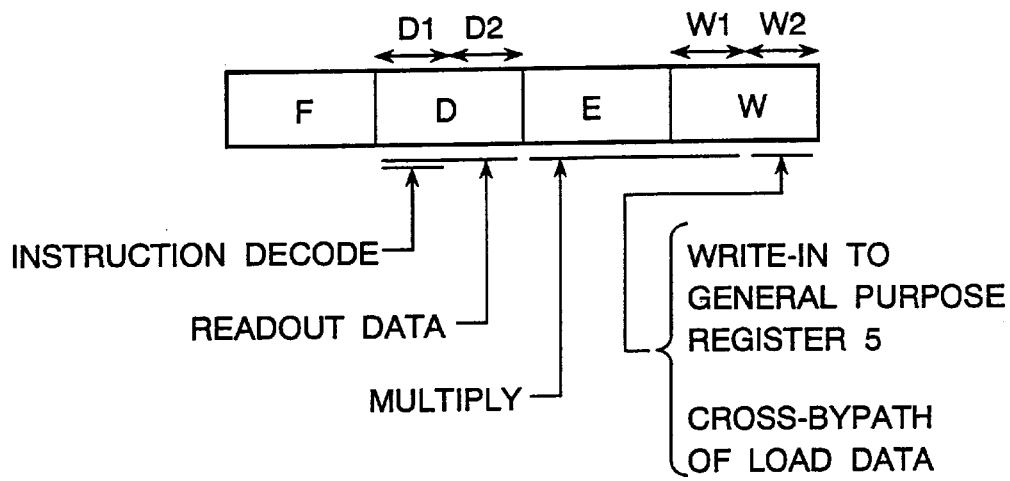
FIG. 20 is an explanation diagram showing the pipeline of an execution timing of a multiplication instruction executed only by an integer operation unit.

FIG. 20 is an explanation diagram showing the pipeline of an execution timing of a multiplication instruction executed only by the integer arithmetic unit 4 in the VLIW microprocessor as the third embodiment. The configuration of the VLIW microprocessor of the third embodiment is same as that of the VLIW microprocessor of the second embodiment. Therefore the explanation of the configuration elements are omitted here.

The VLIW microprocessor of the third embodiment is capable of avoiding occurrences of data hazards and of executing instructions efficiently while keeping data correct without penalties such as stopping of the pipeline operations.

Next, the operation of the VLIW microprocessor will be explained.

First, a multiple sub-instruction is executed only by the integer operation unit 4. The bypath processing control circuit 28 controls the operation of the tri-state buffer 29 shown in FIG. 5. Thereby, the operation result of the generated by the multiple sub-instruction to be executed by the integer operation unit 4 is transferred to the memory access unit 3 through the cross-bypath 22 under the operation of the tri-state buffer 29 controlled by the bypath processing control circuit 28.

The execution timing of the multiple sub-instruction is as follows. First, an instruction is executed during the D1 period in D stage. At the same time, the source data item is read from the general purpose register file 5 to the input latch of the multiplier 17 during the D1 period in D stage and during the D2 period in D stage. The multiple operation is executed during the E1 period and the E2 period in E stage. The operation result of the multiple instruction is outputted to the write back bus during the W1 period in W stage and is written into the general purpose register file 5 during the D2 period in D stage.

The cross-bypath operation for the multiplication result is performed during the W2 period in W stage. That is, the processing of the multiplication operation requires many times. Because the multiplication result is generated in the W1 period in W stage, it is impossible to execute the bypath operation during the E2 period in E stage. Therefore the cross-bypath operation is executed during the W2 period in W stage. The timing of the cross-bypath operation is executed by the tri-state buffer 29 under the control of the bypath processing control circuit 28, so that data can be directly transferred through the cross-bypath 22.

Figure 21:
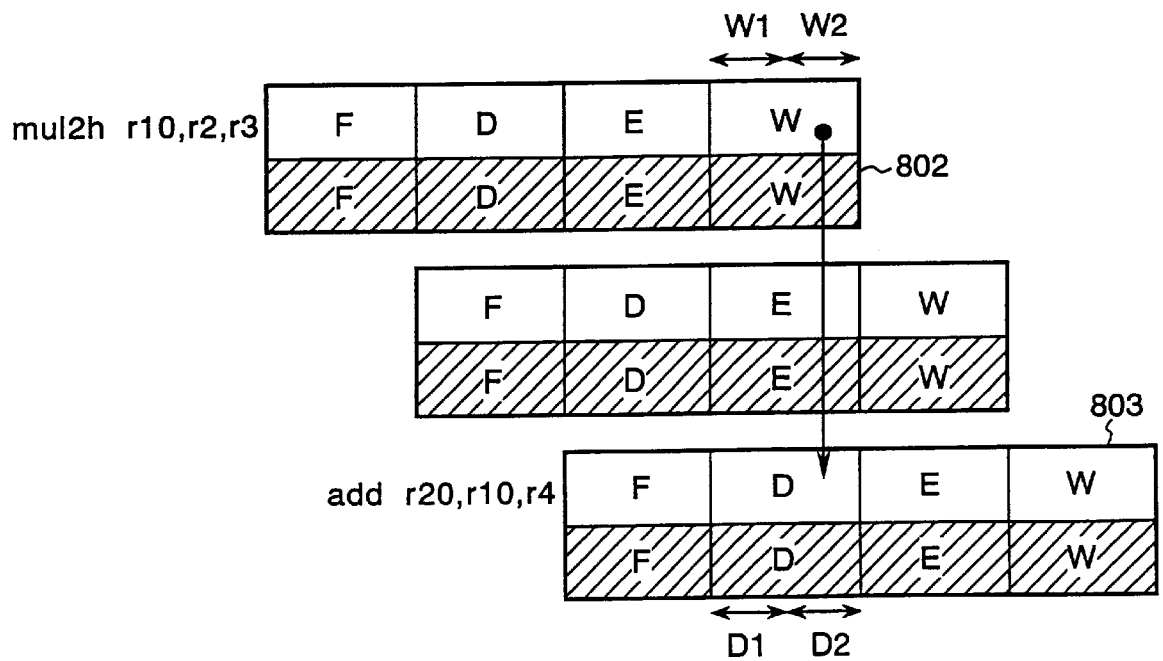
FIG. 21 is an explanation diagram showing the pipeline of a timing of a cross-bypath processing for the execution result of a multiplication instruction executed only by an integer operation unit.

FIG. 21 is an explanation diagram showing the pipeline of a timing of the cross-bypath processing for the execution result of the multiplication instruction executed only by the integer operation unit 4. In FIG. 21, the white sections designate the pipeline to be executed by the memory access unit 3 and the slant lines indicate the pipeline executed by the integer operation unit 4.

The reference number 802 designates the pipeline of the multiple sub-instruction (mu12h r10, r2, r3) executed by the integer operation unit 4. Each operation in the multiple sub-instruction is executed in the timing shown by the pipeline in FIG. 20. The reference number 803 designates the pipeline of the add instruction (add r20, r10, r4) executed by the memory access unit 3 that receives data obtained by the execution of the multiple sub-instruction through the cross-bypath. The multiplication result is directly transferred during the W2 period in W stage of the pipeline 802 and during the D2 period in D stage of the pipeline 803 through the cross-bypath. Thus, because the data bypath operation is executed during the W2 period in W stage, even if it can be performed at the maximum speed in the VLIW microprocessor 1, the bypath operation is executed after two instructions.

Next, the operation of the cross-bypath for the multiplication result shown in FIG. 21 will be explained with reference to the detailed configuration diagrams shown in FIGS. 14A to 14D.

In FIGS. 14A to 14D, the cross-bypath used for the multiplication result is formed by using the cross-bypath 21, the register 211, and the bypath 212. The multiplication result obtained at E stage is stored in the register 57. The result in the register 57 is transferred through the E2D3BUS and E2D4BUS and received by the write back register 56.

During the W1 period in W stage, the value stored in the write back register 56 is outputted on the W1W3EBUS and W1W3OBUS to write it to the general purpose register file 5 during the W2 period in W stage. The multiplication result is stored into the register 211 at the same timing of the write-in operation to the general purpose register file 5. The value stored in the register 211 is outputted to the D2 synchronous bus group in the memory access unit 3 through the cross-bypath 212. This output timing corresponds to the timing in D stage of the pipeline 803 shown in FIG. 21.

The bypath operation is performed from W stage in the pipeline 802 to D stage in the pipeline 803.

As described above, according to the VLIW microprocessor of the third embodiment, the cross-bypath is incorporated between the operation units where it is predicted to happen a data hazard or data interference between the pipelines of the multiple sub-instructions. The data transfer operation in order to transfer data between the operation units through the bypath is controlled by the control circuit and the tri-state buffer 3 having the configurations shown in FIGS. 16 and 17. Thereby, the VLIW microprocessor of the third embodiment is capable of avoiding occurrences of data hazards and of executing instructions efficiently while keeping data correct without penalties such as stopping of the pipeline operations.

Fourth Embodiment

Figure 22:
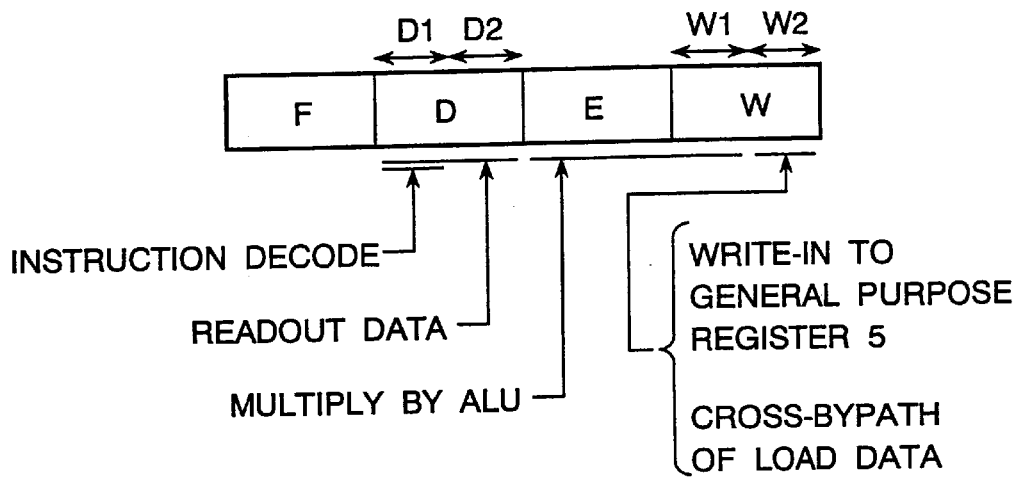
FIG. 22 is an explanation diagram showing a pipeline of an execution timing of a ALU instruction executed by both operation units in the VLIW microprocessor of the fourth embodiment according to the present invention.

FIG. 22 is an explanation diagram showing a pipeline of an execution timing of a ALU instruction executed by both operation units in the VLIW microprocessor as the fourth embodiment. The configuration of the VLIW microprocessor of the fourth embodiment is same as that of the VLIW microprocessor of the first embodiment. Therefore the explanation of the configuration elements are omitted here.

The VLIW microprocessor of the fourth embodiment is capable of avoiding occurrences of data hazards caused between different pipelines of ALU operation sub-instructions and of executing instructions efficiently while keeping data correct without penalties such as stopping of the pipeline operations.

Next, the operation of the VLIW microprocessor of the fourth embodiment will be explained.

An ALU operation instruction is executed in ALUs 15 and 19 in both the memory access unit 3 and the integer operation unit 4. In the fourth embodiment, it will be explained that the operation result generated by the ALU, operation instruction to be executed by the integer operation unit 4 is directly transferred to the memory access unit 3 through the cross-bypath. It is omitted from the following explanation that the operation result of an ALU operation instruction executed by the memory access unit 3 is transferred from the memory access unit 3 to the integer operation unit 4 because this operation is same as the operation from the memory access unit 3 to the integer operation unit 4.

In the timing of a pipeline of the ALU operation sub-instruction, at first, the ALU operation instruction is decoded during the D1 period in D stage. At the same time, a source data item is read from the general purpose register file 5 to the input latch of the ALU 19 during the D1 and D2 periods in D stage. Then, the ALU operation is executed during the E1 and E2 period in E stage. After this, the operation result is outputted to the write back bus during the W1 period in W stage, and it is written into the general purpose register file 5 during the W2 period in W stage.

Figure 23:
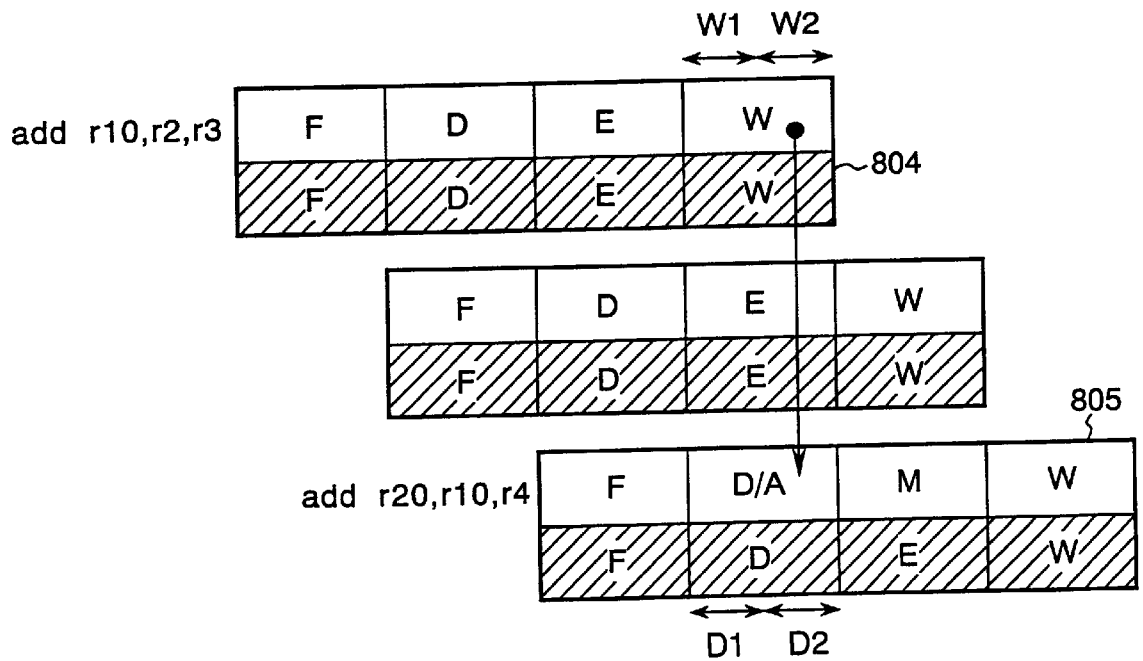
FIG. 23 is an explanation diagram showing a pipeline of a timing of a cross-bypath processing for the result of the ALU operation.

FIG. 23 is an explanation diagram showing the pipeline of the timing of a cross-bypath processing for the result of the ALU arithmetic operation. In FIG. 23, the white sections designate the pipeline to be executed by the memory access unit 3 and the slant line sections indicate the pipeline executed by the integer operation unit 4.

The reference number 804 is the pipeline of the ALU sub-instruction (add r10, r2, r3) executed by the integer operation unit 4. Each operation of the ALU operation sub-instruction is executed in the timing of the pipeline shown in FIG. 22, for example. The reference number 805 indicates the pipeline of the add instruction (add r20, r10, r4) to be executed by the memory access unit 3, in which a data item as the operation result of the ALU operation sub-instruction is transferred through the cross-bypath. That is, the operation result of the ALU operation sub-instruction is transferred through the cross-bypath during the W2 period in W stage in the pipeline 804 and the D2 period in D stage of the pipeline 805. Thus, because the cross-bypath operation for the operation result of the ALU operation sub-instruction is executed during the W2 period in W stage of the pipeline 804 and during the D2 period in D stage of the pipeline 805, even if it can be performed at the maximum speed in the VLIW microprocessor 1, the bypath operation is executed after two instructions.

Next, the operation of the cross-bypath for the multiplication result shown in FIG. 23 will be explained with reference to the detailed configuration diagrams shown in FIGS. 14A to 14D.

In FIGS. 14A to 14D, the path through which the cross-bypath operation is performed is the path 221. The operation result of the ALU operation sub-instruction executed in E stage of the pipeline 804 is stored into the register 55. The operation result stored in the register 55 is written into the write back register 54 in the W1 period in W stage. In this W1 period in W stage, the value in the write back register 55 is written into the general purpose register file 5 during the W2 period in W stage. The operation result of the ALU operation sub-instruction is outputted to the D1S5BUS through the path 221 in the same timing of the data output operation to the W1W2BUS. Because the D1S5BUS is the common bus between the memory access unit 3 and the integer operation unit 4, data on the D1S5BUS can be used by the memory access unit 3. This data output timing to the D1S5BUS corresponds to the timing in W stage of the pipeline 804 shown in FIG. 23. Therefore the cross-bypath operation can be executed from W stage of the pipeline 804 to D stage of the pipeline 805.

As described above, according to the VLIW microprocessor of the fourth embodiment, as shown in FIGS. 22 and 23, the dedicated cross-bypath (data transfer path) is incorporated between different operation units where it is predicted to happen a data hazard or data interference between the pipelines of the ALU sub-instructions. The data transfer operation in order to transfer data between the operation units through the cross-bypath is controlled by the bypath processing control circuit and the tri-state buffer having the configurations shown in FIGS. 16 and 17. Thereby, the VLIW microprocessor of the fourth embodiment is capable of avoiding occurrences of data hazards and of executing instructions efficiently while keeping data correct without penalties such as stopping of the pipeline operations.

Fifth Embodiment

Figure 24:
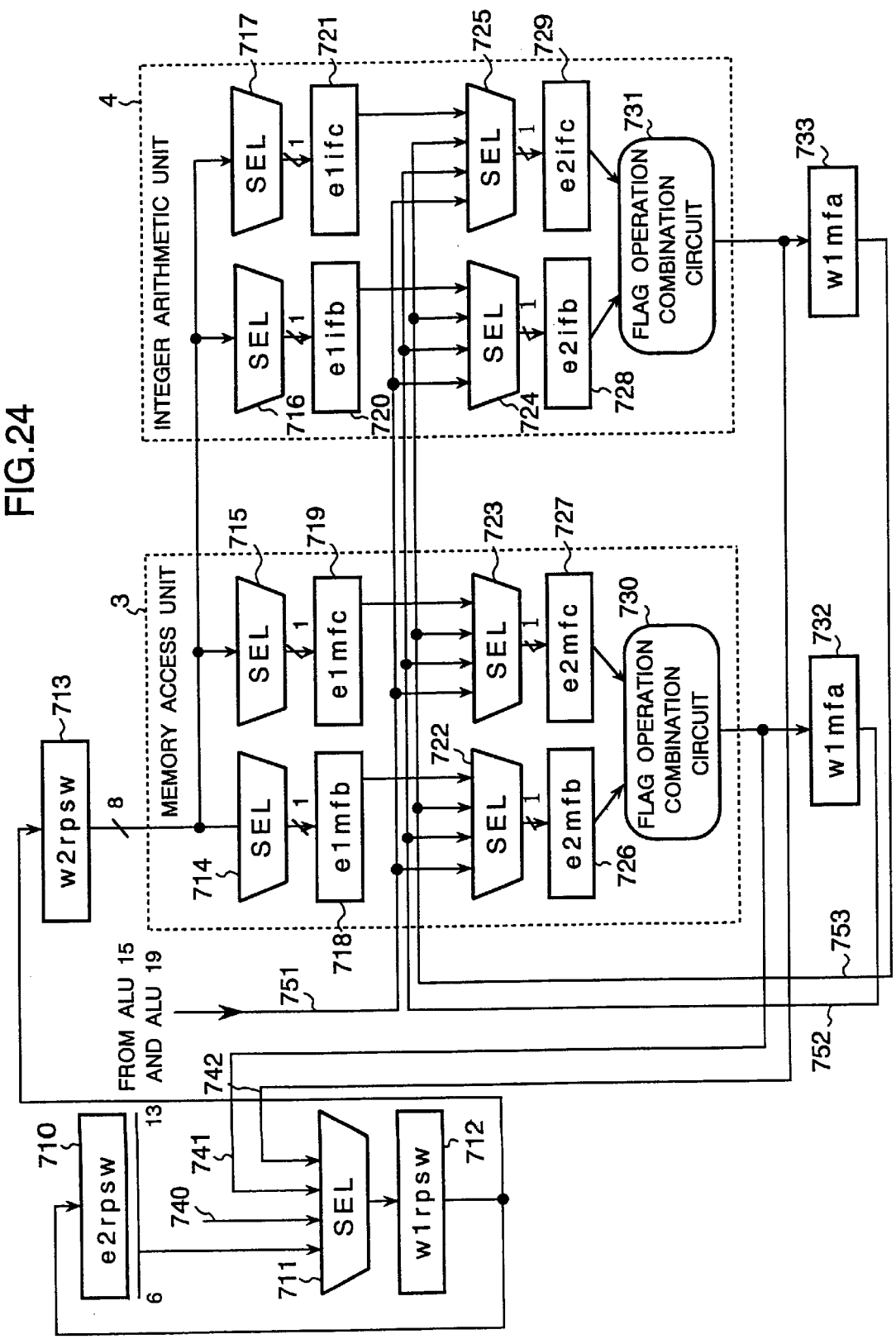
FIG. 24 is a block diagram showing a control circuit used for executing a cross-bypath processing of a flag operation sub-instruction in the VLIW microprocessor of the fifth embodiment according to the present invention.

FIG. 24 is a block diagram showing a control circuit used for executing a cross-bypath processing of a flag operation sub-instruction in the VLIW microprocessor of the fifth embodiment. The circuits 710–713, 732, and 733 for executing the flag operation sub-instruction are incorporated in the PSW 10 in the instruction decode unit 2 shown in FIG. 5 and FIGS. 14A to 14D. Other components of the VLIW microprocessor of the fifth embodiment are the same as those of the VLIW microprocessor of the first embodiment, therefore the explanation of the other components are omitted here.

In FIG. 24, the reference numbers 710 and 712 are the lower 8-bit master register and the lower 8-bit slave register in the processor status flag register, respectively. As the PSW has been explained with FIG. 11, the flags F0 to F7 are stored in the lower 8-bit registers. The flag operation sub-instructions for these flags F0 to F7 are executed by the VLIW microprocessor shown in FIG. 5. There are ANDFG, ORFG, XORFG, and NOTFG as the flag operation sub-instructions. ANDFG is the flag operation sub-instruction to execute AND operation between flags. ORFG executes OR operation between flags. XORFG executes exclusive OR (XOR) operation between flags. NOTFG executes to reverse the value of a flag.

The reference number 711 designates a selector for selecting one of flags to be written into the register 712. The reference number 740 denotes a bypath (data transfer path) through which a flag value generated by the execution of the flag operation sub-instruction is written into the register 712. The reference numbers 741 and 742 indicate a bypath (data transfer path) through which the operation result of a flag operation sub-instruction (that will be explained later) is written into the register 712. These bypaths correspond to the bypaths 40 and 41. The reference number 713 designates a register to receive the value in the register 712 and to output it during the W2 period in D stage.

The reference numbers 714, 715, 716, and 717 designate 8-to-1 selector (selection means) for selecting one bit value in a 8-bit value stored in the register 713. The reference numbers 718, 719, 720, 721 designate registers to receive the values of the selector 714, 715, 716, and 717 and to output them during the E1 period in E stage, respectively.

The reference numbers 722, 723, 724, and 725 indicate selectors for selecting one of values in the bypaths (data transfer path) 751, 752, and 753. The reference numbers 726, 727, 728, 729 designate registers to receive the values of the selector 722, 723, 724, and 725 and to output them during the E2 period in E stage, respectively. The reference numbers 730 and 731 indicate combination circuits to execute the flag operation sub-instruction described above. The combination circuit 730 is incorporated in the memory access unit 3 to executes a flag operation sub-instruction by using 2-bit values obtained from the registers 726 and 727. The combination circuit 731 is incorporated in the integer operation unit 4 to executes a flag operation sub-instruction by using 2-bit values obtained from the registers 728 and 729. The outputs from the combination circuits 730 and 731 for the flag operation are written into the register 712 through the bypaths 741, 742 and the selector 711.

The reference numbers 732 and 733 designate registers to receive the output result transferred from the combination circuits 730 and 731 and to output them during the W1 period in W stage. The reference numbers 751 and 752 denote bypaths, 751 designates a bypath to transfer a flag value generated by executing the flag operation sub-instruction.

The reference number 752 designates a bypath for transferring the operation result of the flag operation sub-instruction executed by the-memory access unit 3. The reference number 753 indicates a bypath for transferring the flag operation sub-instruction that has been executed by the integer operation unit 4.

In the fifth embodiment, the dedicated cross-bypaths are incorporated between different operation units in the VLIW microprocessor in order to transfer a flag in the execution of flag operation sub-instructions. Thereby, the VLIW microprocessor of the fifth embodiment is capable of avoiding occurrences of data hazards and of executing flag operation sub-instructions efficiently while keeping data correct without penalties such as stopping of the pipeline operations.

Next, the operation of the VLIW microprocessor of the fifth embodiment will be explained.

Figure 25:
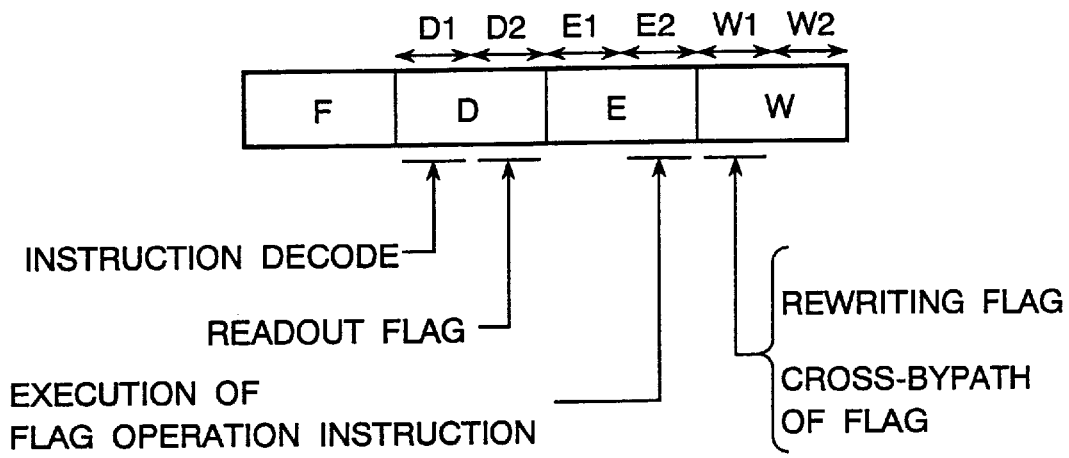
FIG. 25 is an explanation diagram showing the pipeline of an execution timing of the flag operation sub-instruction.

FIG. 25 is an explanation diagram showing the execution timing of a pipeline for a flag operation sub-instruction executed in the VLIW microprocessor 1 of the fifth embodiment.

As shown in FIG. 25, at first, the flag operation sub-instruction is decoded in the D1 period in D stage. During the D2 period in D stage, source data items are read from the processor state flag registers 710 and 712 to the input latch of to the operation unit for executing the flag operation sub-instruction.

The cross-bypath processing of the operation result is performed during the W1 period in W stage. Such a flag operation sub-instruction is executed by both the memory access unit 3 and the integer operation units as the different operation units.

Figure 26:
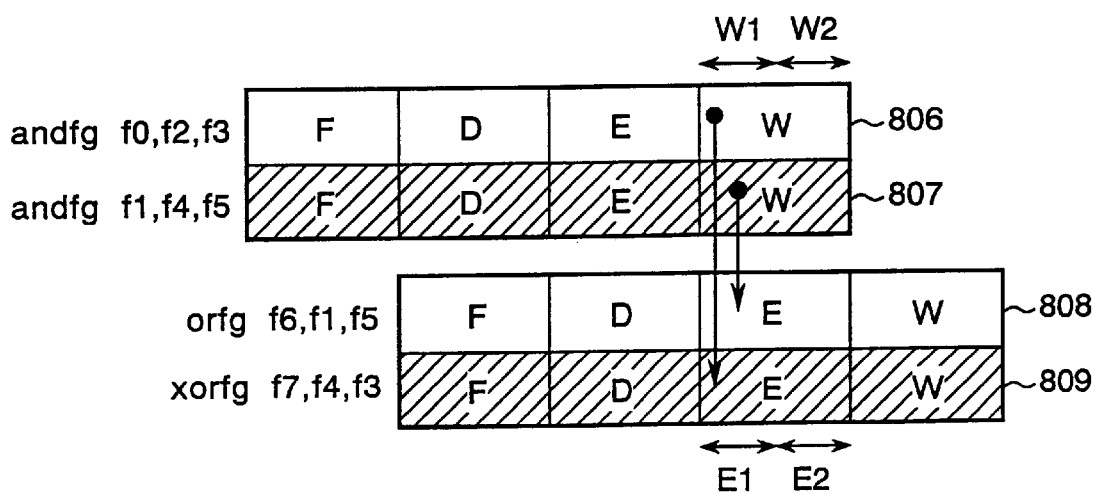
FIG. 26 is an explanation diagram showing the pipeline of a timing of a cross-bypath of the flag operation sub-instruction.

FIG. 26 is an explanation diagram showing the execution timing of the cross-bypath in a pipeline of the flag operation sub-instruction. In FIG. 26, the white sections designate the pipeline to be executed by the memory access unit 3 and the slant line sections indicate the pipeline executed by the integer operation unit 4.

The reference number 806 designates the pipeline of the flag operation sub-instruction (and fg fo, f2, f3) executed by the memory access unit 3. The reference number 807 denotes the pipeline of the flag operation sub-instruction (andfg f1, f4, f5) executed by the integer operation unit 4. The flag operation sub-instruction is executed based on the timing shown in the pipeline in FIG. 25.

The reference number 808 indicates the pipeline of the flag operation sub-instruction (orfg f6, f1, f5) to be executed by the memory access unit 3. The reference number 809 indicates the pipeline of the flag operation sub-instruction (xorfg f7, f0, f3), receiving the flag value from other pipeline 806 of the flag operation sub-instruction, to be executed by the integer operation unit 4. In this case, the operation result of the flag operation sub-instruction is transferred during the W1 period in W stage of the pipeline 807 and during the E1 period in E stage of the pipeline 809 through the cross-bypath. Thus, the operation results of the flag operation sub-instructions executed by different operation units can be transferred to each other simultaneously.

Next, the cross-bypath operation between the flag operation sub-instructions will be explained with reference to FIG. 24.

In FIG. 24, the cross-bypath between the flag operation sub-instructions is the paths 752 and 753. That is, the operation result of the flag operation sub-instruction executed by the memory access unit 3 is transferred to the integer operation unit 4 through the bypath 752. In addition to this, the operation result of the flag operation sub-instruction executed by the integer operation unit 4 is transferred to the memory access unit 3 through the bypath 753. This bypath corresponds to the bypath 41 shown in FIG. 5.

The operation result of the flag operation sub-instruction executed in E stage of the pipeline 806 is stored in the register 732. This stored data as the operation result is written into the register 728 or the register 729 through the cross-bypath 752, the selectors 724 and 725 during the W1 period in W stage. This write timing is corresponding to E stage of the pipeline 809.

In addition, the operation result of the flag operation sub-instruction executed in E stage of the pipeline 807 is stored in the register 733. This stored data as the operation result is written into the register 726 or the register 727 through the cross-bypath 753, the selectors 722 and 723 in the W1 period in W stage. This write timing corresponds to E stage of the pipeline 808.

As described above, according to the fifth embodiment, the dedicated cross-bypaths for transferring flags in the execution of flag operation sub-instructions executed between different operation units are incorporated in the VLIW microprocessor. Thereby, the VLIW microprocessor of the fifth embodiment is capable of avoiding occurrences of data hazards and of executing instructions efficiently while keeping data correct without penalties such as stopping of the pipeline operations.

Sixth Embodiment

The VLIW microprocessor of the sixth embodiment is capable of executing the bypath operation for flag values as the operation results executed by the ALU 15 in the memory access unit 3 and the ALU 19 in the integer operation unit 4. The components of the VLIW microprocessor of the sixth embodiment are same as those of the VLIW microprocessor of the fifth embodiment, therefore the explanation of the components are omitted here.

Next, the operation of the bypath operation of flag values executed in the VLIW microprocessor of the sixth embodiment will be explained.

Like the bypath operations between the flag operation sub-instructions as described in the explanation of the fifth embodiment, the operation results obtained by the execution of the ALU 15 and ALU 19 are transferred to other flag operation sub-instructions through cross-bypaths. The timing of the cross-bypath processing for the flag value of the ALU operation in the sixth embodiment is same as the timing shown in FIGS. 25 and 26 that have been used for the explanation of the fifth embodiment.

The cross-bypath operation for the flag value of the ALU operation in the sixth embodiment will be explained with reference to FIGS. 14A to 14D and FIG. 24.

As shown in the detailed block diagrams shown in FIGS. 14A to 14D, the flag operation sub-instruction is executed by the ALU 15 in the memory access unit 3 during the E1 period and the E2 period in E stage. The flag generated by the execution of this flag operation sub-instruction is transferred to the instruction decode unit 2 through the bypath (data transfer path) 62. In the same manner, the flag operation sub-instruction is executed by the ALU 19 and the saturation operation unit 213 in the integer operation unit 4 during the E1 period and the E2 period in E stage. The flag generated by the execution of this flag operation sub-instruction is transferred to the instruction decode unit 2 through the bypaths (data transfer path) 63 and 64.

In the block diagram of the circuit to execute the flag operation sub-instruction shown in FIG. 24, the flag values outputted from the ALU 15 and ALU 19 are transferred to the registers 726, 727, 728, and 729 through the bypath 751 and the selectors 722 to 725. The operation after this flag transfer operation described above is same as that of the VLIW microprocessor of the fifth embodiment.

As described above, according to the sixth embodiment, the dedicated cross-bypaths for transferring flags obtained by the execution of flag operation sub-instructions executed by the ALU in each operation unit are incorporated in the VLIW microprocessor so that the flags are transferred between the different operation units to each other. Thereby, the VLIW microprocessor of the sixth embodiment is capable of avoiding occurrences of data hazards and of executing instructions efficiently while keeping data correct without penalties such as stopping of the pipeline operations.

Seventh Embodiment

FIG. 27 is a block diagram showing a detailed configuration of a bypath through which load data is transferred directly in the VLIW microprocessor of the seventh embodiment. In FIG. 27, the reference number 201 designates a sign extension section for extending a sign of a load data item, 200 indicates a path for connecting the operand data bus M2ODBUS to the sign extension section 201, and 761, 762, and 763 denote selectors (selection means) for selecting one of the upper word and the lower word in the output of the sign extension section 201. The operation of each of the selectors 761, 762, and 763 is controlled based on the selector control signal outputted from the bypath processing control circuit 28. Other components of the VLIW microprocessor of the seventh embodiment are same as those of the VLIW microprocessor of the first embodiment, the explanation of the other components are therefore omitted here.

The reference numbers 755, 756, and 757 designate tri-state buffers by which the output from the selector 761, 762, and 763 is transferred to the D1 synchronous bus group. The load data item is transferred to D2S3BUS, D2S4BUS, and D2S5IBUS through the tri-state buffers 755, 756, and 757 when the bypath selection signal is effective or active. The selector 503 shown in FIGS. 10A to 10D corresponds to the selector for selecting one word in a double word data item and for outputting the selected word data item.

Figure 28:
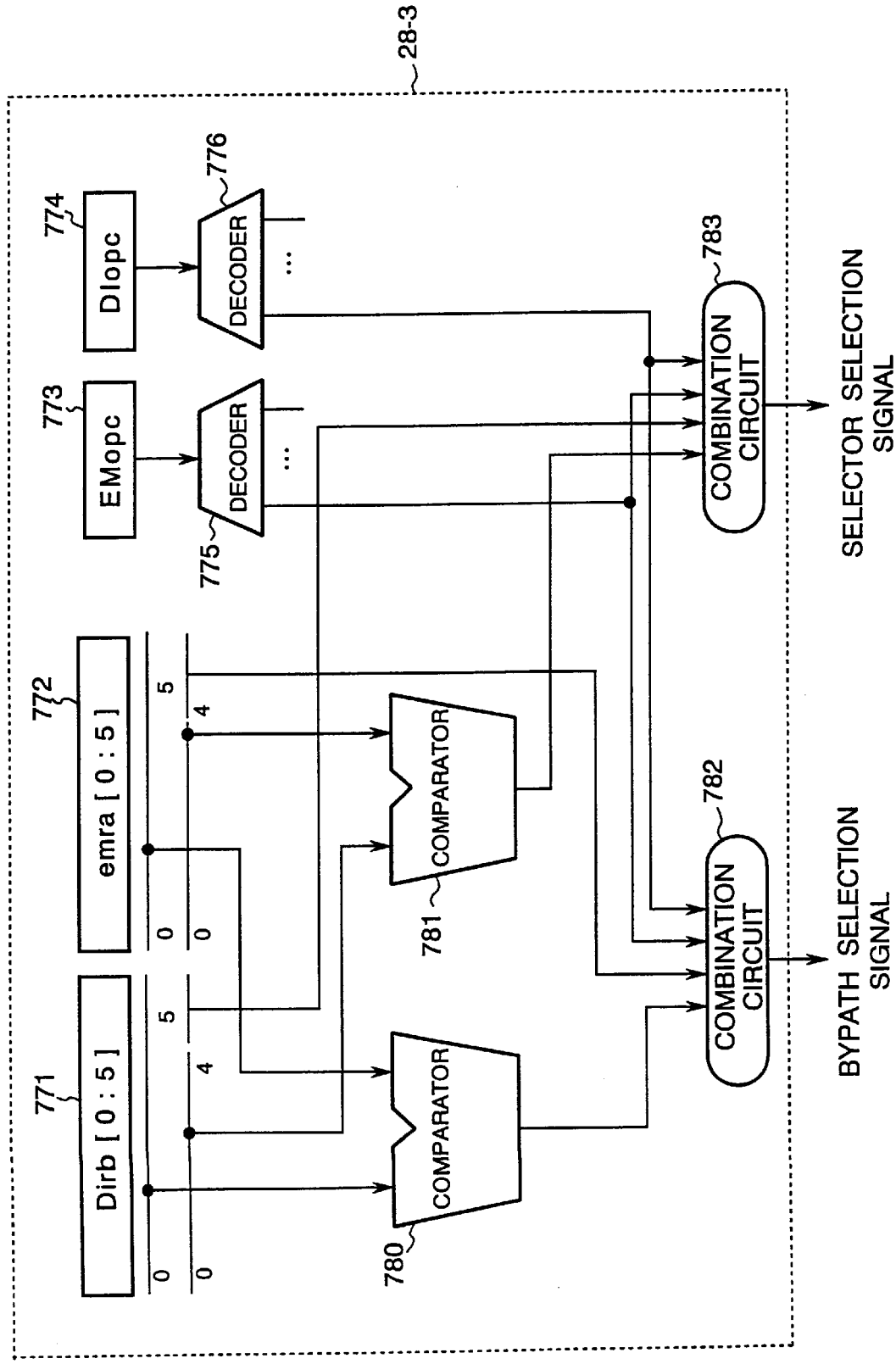
FIG. 28 is a block diagram showing a bypath control circuit used for processing the bypath operation between instructions having different operand sizes.

FIG. 28 is the block diagram showing the configuration of the control circuit 28-3 for controlling the operation of the bypath shown in FIG. 27. In FIG. 28, the reference number 771 indicates the register for storing the source register designation field dirb [0:5], 722 designates a register for storing the destination register designation field emra [0:5]. The reference number 774 denotes a register for storing an opcode DIopc, 780 indicates a comparator for comparing the source register designation field in the register 771 with the destination designation field in the register 772, and for outputting an agreement signal when both register values are same. The reference number 781 indicates a comparator for comparing the upper 5 bits of data in the source register designation field in the register 771 with the upper 5 bits of data in the destination designation field in the register 772, and for outputting an agreement signal when both upper 5 bit values are same. The reference number 775 denotes a decode circuit for decoding the opcode in the register 773 and for generating an instruction designation signal to indicate the type of the instruction which is currently executing in E stage by the memory access unit 3.

The reference number 776 designate a decode circuit for decoding the opcode in the register 774 and for generating an instruction designation signal to indicate the type of the instruction which is currently executing in D stage by the integer operation unit 4. The reference number 782 indicates a combination circuit for receiving the agreement signal from the comparator 780, the instruction designation signals from the decode circuits 775 and 776, and the lowest bit of data in the register 772, and then for outputting the bypath selection signal.

The reference number 783 designates a combination circuit for receiving the agreement signal from the comparator 781, the instruction designation signals from the decode circuits 775 and 776, and the lowest bit of data in the register 771, and then for outputting the selector control signal.

The bypath control circuit 28-3 having the configuration shown in FIG. 28 controls the operation of the cross-bypath (data transfer path) where one word in a double word data item is transferred.

In the seventh embodiment, the bypath operation is performed from a 64-bit double word data item to a 32-bit word data item by incorporating the cross-bypath in order to execute the instructions having different operand sizes. For example, when the destination register designation field of a preceding instruction to process a double word data item executed by a different operation unit and the source register designation field of the following instruction to process a word data item executed by both operation units are the same and when a data hazard happens between different operation units, required data items are transferred between the operation units through the cross-bypath by using the selector for selecting one of the upper word data item and the lower word data item in the double word data item. Thereby, the VLIW microprocessor of the seventh embodiment is capable of avoiding occurrences of data hazards and of executing instructions efficiently while keeping data correct without penalties such as stopping of the pipeline operations.

Next, the operation of the VLIW microprocessor of the seventh embodiment will be explained.

Hereinafter, the case that a load instruction is executed will be explained.

Figure 29:
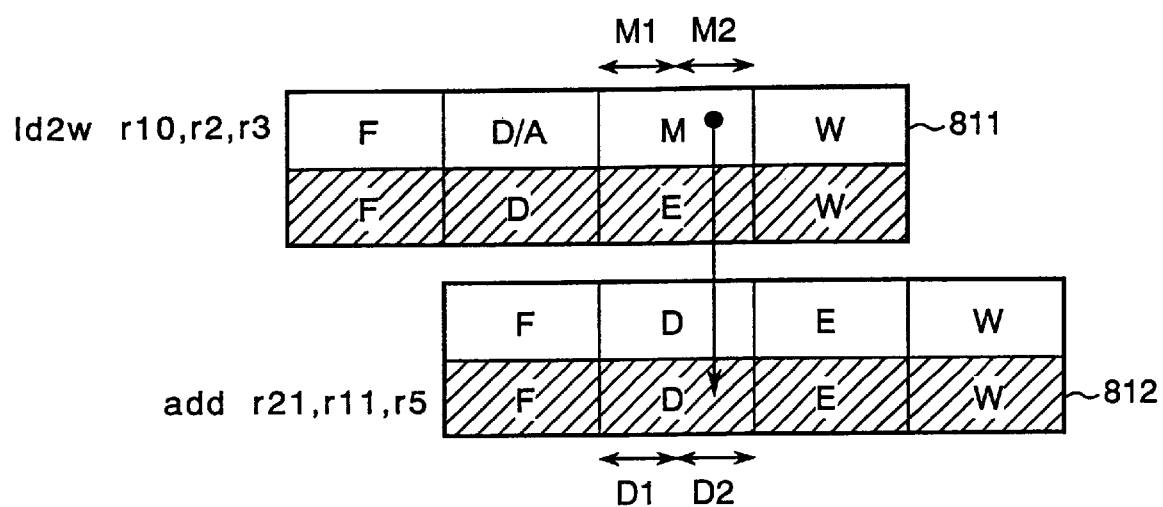
FIG. 29 is a timing chart showing a bypath processing between the pipelines of instructions having different operand sizes.

FIG. 29 is a timing chart showing a bypath processing between the pipelines of instructions having different operand sizes. In FIG. 29, the white sections designate the pipeline to be executed by the memory access unit 3 and the slant line sections indicate the pipeline executed by the integer operation unit 4.

The reference number 811 indicates the pipeline of a load instruction (1d2w r10, r2, r3) to load a double word data item executed by the memory access unit 3. The execution timing of the load instruction is same as the pipeline executed by the memory access unit 3 shown in FIG. 18.

The loaded double word data item is stored into the registers R10 and R11 in the general purpose register file 5. The reference number 812 designates a pipeline of the add instruction (add r21, r11, r5) to be executed by the integer operation unit 4 in which a load data item is transferred from the load instruction execution unit through the cross-bypath.

As designated by the arrow shown in FIG. 29, the timing of the cross-bypath is same as that of the cross-bypath of the load instruction shown in FIG. 19. That is, the cross-bypath operation is performed from the M2 in M stage of the pipeline 811 and to the D2 in D stage of the pipeline 812. The data transferred in the bypath processing is the lower word data item in the loaded double word data item. The data item that is written into the register R11 by executing the load instruction is transferred through the cross-bypath in order to use the source data item of the add instruction.

As described above, according to the VLIW microprocessor of the seventh embodiment, the bypath processing from a double word data item (a 64 bit wide) to a word data item (a 32 bit wide) can be executed by incorporating the cross-bypath used for transferring data between different operand sizes.

For example, as described above, when the destination register designation field of a preceding instruction to process a double word data item executed by a different operation unit and the source register designation field of the following instruction to process a word data item executed by both operation units are the same and when a data hazard happens between different operation units, required data items are transferred between the operation units through the cross-bypath by using the selector for selecting one of the upper word data item and the lower word data item in the double word data item. Thereby, the VLIW microprocessor of the seventh embodiment is capable of avoiding occurrences of data hazards and of executing instructions efficiently while keeping data correct without penalties such as stopping of the pipeline operations.

Eighth Embodiment

Figure 30:
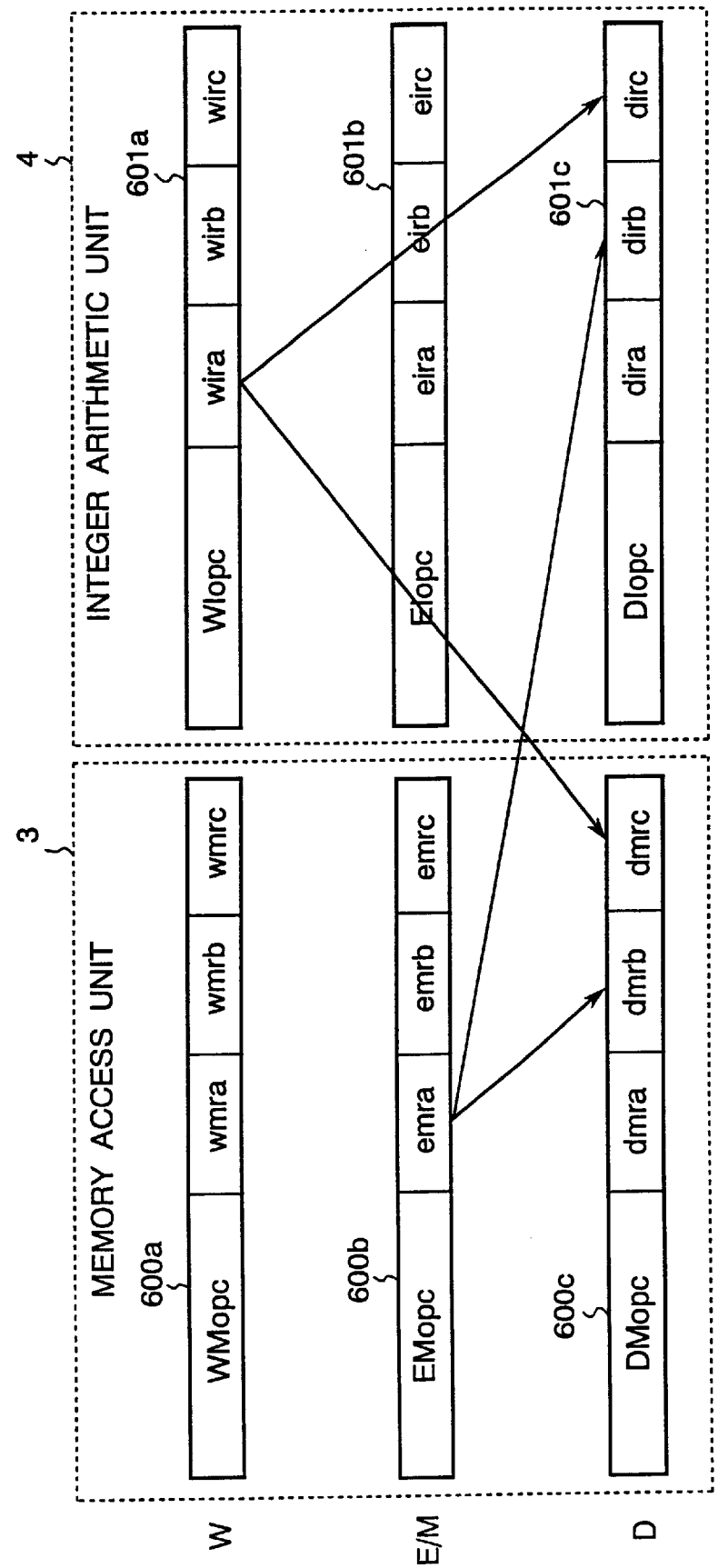
FIG. 30 is an explanation diagram showing a data hazard caused between instruction codes generating a plurality of pipeline processings in the VLIW microprocessor of the eighth embodiment.

FIG. 30 is an explanation diagram showing a data hazard caused between instruction codes generating a plurality of pipeline processes in the VLIW microprocessor as the eighth embodiment. The configuration of the VLIW microprocessor of the eighth embodiment is same as that of the VLIW microprocessor of the first and seventh embodiments. Therefore the explanation of the configuration is omitted here.

Here, the bypath processing to a plurality of pipelines is defined as the bypath processing from one pipeline to other different pipelines. In FIG. 30, the reference numbers 600a, 600b, and 600c indicate the instruction codes in W stage, E/M stage, D stage to be executed by the memory access unit 3. The reference numbers 601a, 601b, and 601c designate instruction codes in W stage, E/M stage, D stage to be executed by the integer operation unit 4. In each instruction code shown in FIG. 30, there are an opcode, a destination register designation field, and two source register designation fields as viewed from the front. The head two character part in each field designates the stage type and the type of the operation unit. That is, the head two character part "WM" indicates the execution in W stage by the memory access unit 3, for example.

In the eighth embodiment, when the destination register designation fields of preceding instructions to be executed by both operation units such as the memory access unit 3 and the integer operation unit 4 are agreed with the source register designation fields of following instructions to be executed by both operation units, and when data hazards happen between the operation units, data items are transferred through multi-bypaths between the both operation units. Thereby, the VLIW microprocessor of the eighth embodiment is capable of avoiding occurrences of data hazards and of executing instructions efficiently while keeping data correct without penalties such as stopping of the pipeline operations.

Next, the operation of the VLIW microprocessor of the eighth embodiment will be explained.

As shown in FIG. 30, it can be understood that data hazards will happen because the destination register designation field emra of the instruction code executed by the memory access unit 3 during E stage is equal to the two source register designation fields dmrb and dirb. In addition, it can also be understood that data hazards will happen because the destination register designation field wira of the instruction code executed by the integer operation unit 4 during W stage is equal to the two source register designation fields dmrc and dirc. The bypath processing in order to avoid the occurrence of such data hazards described above is called multi-bypath processing. In multi-bypath processing, one of the data items is transferred to a plurality of pipelines through different bypaths.

As described above, according to the eighth embodiment, when the destination register designation fields of preceding instructions to be executed by the memory access unit 3 and the integer operation unit 4 are equal to the source register designation fields of following instructions to be executed by the memory access unit 3 and the integer operation unit 4, and when data hazards happened between the memory access unit 3 and the integer operation unit 4, data items are transferred through the multi-bypaths between both operation units 3 and 4. Thereby, the VLIW microprocessor of the eighth embodiment is capable of avoiding occurrences of data hazards and of executing instructions efficiently while keeping data correct without penalties such as stopping of the pipeline operations.

Ninth Embodiment

Figure 31:
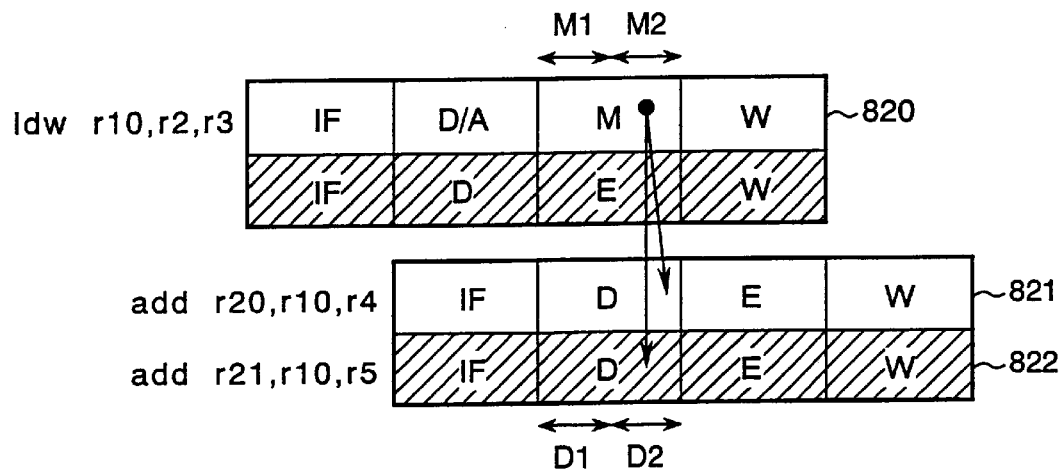
FIG. 31 is a timing chart showing a cross-bypath processing of load data to a plurality of pipelines in the VLIW microprocessor of the ninth embodiment.

FIG. 31 is a timing chart showing a cross-bypath processing of load data to a plurality of pipelines in the VLIW microprocessor of the ninth embodiment.

In FIG. 31, the white sections designate the pipeline to be executed by the memory access unit 3 and the slant line sections indicate the pipeline executed by the integer operation unit 4. The configuration of the VLIW microprocessor of the eighth embodiment is same as that of the VLIW microprocessor of the first and second embodiments, therefore, the explanation of the configuration is omitted here.

The reference number 820 designates the pipeline of a load instruction (1dw r10, r2, r3) executed by the memory access unit 3. The timing showing the execution of this load instruction is same as the timing shown in FIG. 17.

The reference number 821 indicates the pipeline of an add instruction (add r20, r10, r4), to be executed by the memory access unit 3 itself, to receive a load data item transferred from the memory access unit 3 through a bypath.

The reference number 822 designates the pipeline of an add instruction (add r21, r10, r5), to be executed by the integer operation unit 4, to receive a load data item transferred from the memory access unit 3 through the cross-bypath. As shown by the arrows in FIG. 31, the same data item is transferred simultaneously from the M2 in the pipeline 820 to both the D2 in the pipeline 821 and the D2 in the pipeline 822 through the cross-bypaths. In the pipelines 821 and 822, the following stages E and M are executed by using the data item transferred through the bypath from the M2 in the pipeline 820.

In the ninth embodiment, when the destination register designation field of a preceding instruction to be executed by the memory access unit 3 is equal to the source register designation fields of instructions to be executed by both the memory access unit 3 and the integer operation unit 4 immediately following the above instruction, and when data hazards happen between a plurality of operation units such as the operation units 3 and 4, a data item is transferred through the multi-bypaths between the both operation units 3 and 4. Thereby, the VLIW microprocessor of the ninth embodiment is capable of avoiding occurrences of data hazards and of executing instructions efficiently while keeping data correct without penalties such as stopping of the pipeline operations.

Next, the explanation of the cross-bypath operations from the loaded data item shown in FIG. 31 to a plurality of pipelines will be described by using the block diagrams showing the detailed configuration of the VLIW microprocessor 1, as shown in FIGS. 14A to 14D.

In FIGS. 14A to 14D, the multi-bypaths used for cross-bypath operations of the loaded data item are formed by using the sign extension section 300, the bypath (data transfer path) 225, the bypath (data transfer path) 200, the sign extension section 201, the bypath (data transfer path) 202.

At first, in the load instruction processing executed in the pipeline 820, the memory access operation is executed in M stage. The address used for data memory accessing is transferred onto the address bus M1OABUS during M stage. On the other hand, the loaded data item is transferred from the data memory (namely, from the data RAM 7) to the bus M2ODBUS during M2 period in M stage. The data item on the load data bus M2ODBUS is transferred to the sign extension sections 201 and 330 through the path 200. The sign extension sections 201 and 330 receive the data item on the bus M2ODBUS.

The data item is transferred from the sign extension sections 201 and 330 to the D2 synchronous bus group in the memory access unit 3 and the D2 synchronous bus group in the integer operation unit 4 through the cross-bypath 202 and the bypath 225. This output timing corresponds to the timing of the pipelines 821 and 822 shown in FIG. 31. Thereby, the multi-bypath processing from the M2 in the pipeline 820 to the D2 in the pipelines 821 and 822 is executed.

As described above, according to the ninth embodiment of the present invention, when the destination register designation field of a preceding instruction to be executed by the memory access unit 3 is equal to the source register designation fields of instructions to be executed by both the operation units immediately following the above instruction, and when data hazards happen between the plurality of operation units such as the operation units 3 and 4, a data item is transferred through the multi-bypaths between both operation units 3 and 4. Thereby, the VLIW microprocessor of the ninth embodiment is capable of avoiding occurrences of data hazards and of executing instructions efficiently while keeping data correct without penalties such as stopping of the pipeline operations.

Tenth Embodiment

Figure 32:
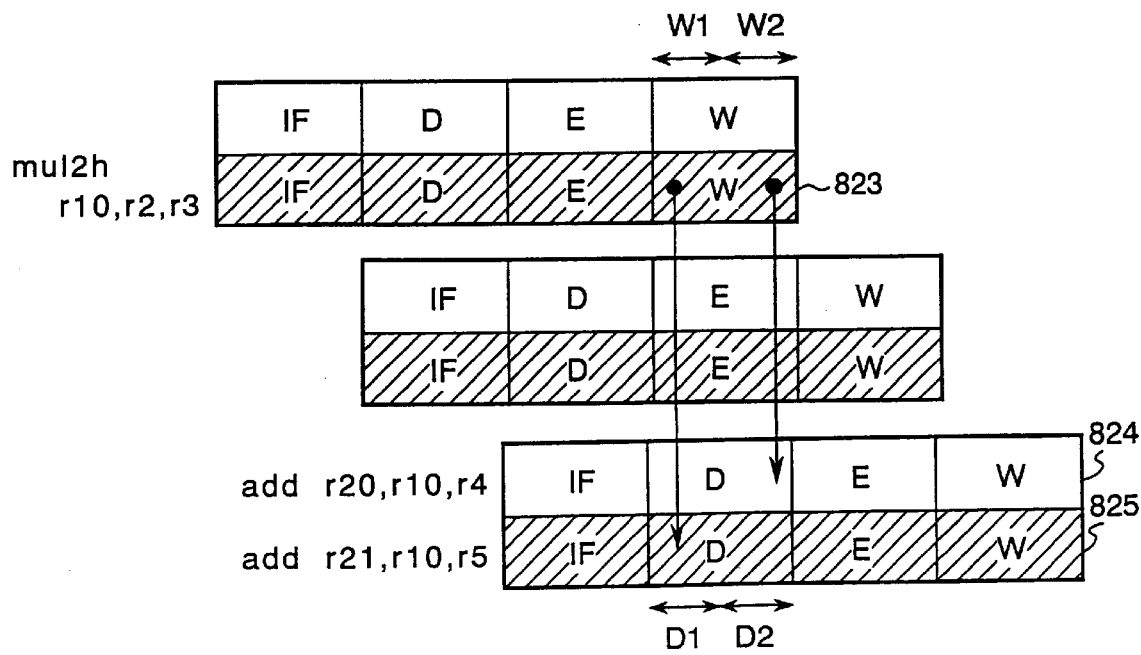
FIG. 32 is a timing chart showing a multi-bypath processing of the result of multiplication processing in the VLIW microprocessor of the tenth embodiment according to the present invention.

FIG. 32 is a timing chart showing a multi-bypath processing of the execution result of multiplication processing executed by the VLIW microprocessor of the tenth embodiment. The VLIW microprocessor of the tenth embodiment performs the multi-bypath processing of the execution result of a multiple sub-instruction to a plurality of pipelines. The configuration of the VLIW microprocessor of the tenth embodiment is same as that of the VLIW microprocessor of the first and third embodiments, therefore, the explanation of the configuration is omitted here.

In FIG. 32, the white sections designate the pipeline to be executed by the memory access unit 3 and the slant line sections indicate the pipeline executed by the integer operation unit 4.

The reference number 823 designates the pipeline of the multiple sub-instruction (mu12h r10, r2, r3) executed by the integer operation unit 4. Each processing in the multiple sub-instruction is executed in the timing of the pipeline shown in FIG. 20. The reference number 824 indicates the pipeline of the add instruction (add r20, r10, r4), to receive the data item from the multi sub-instruction through the cross-bypath, executed by the memory access unit 3.

The reference number 825 denotes the pipeline of the add sub-instruction (add r21, r10, r5), also to receive the data item from the multi sub-instruction through the cross-bypath, executed by the integer operation unit 4. In this case, the multiplication result is transferred from the W2 in W stage of the pipeline 823 to the D2 in D stage of the pipeline 824 through the cross-bypath. The multiplication result is also transferred from the W1 in W stage of the pipeline 823 to the D1 in D stage of the pipeline 825 through the cross-bypath. Thus, in the multi-bypath processing of the multiple instruction, the same data item such as the multiplication result is transferred to different pipelines in differ- ent timings. Further, it is adequately required in execution time to execute the multiple sub-instruction, even if the bypath processing is performed with a high speed, the multi-bypath processing must be executed only after the execution of two instructions.

In the tenth embodiment, when the destination register designation field of a preceding instruction to be executed by the integer operation unit 4 is equal to the source register designation fields of instructions to be executed after two clocks of the execution of the above instruction by both the memory access unit 3 and the integer operation unit 4, and when data hazards happen between a plurality of operation units such as the operation units 3 and 4, a data item is transferred through the multi-bypaths between the both operation units 3 and 4. Thereby, the VLIW microprocessor of the ninth embodiment is capable of avoiding occurrences of data hazards and of executing instructions efficiently while keeping data correct without penalties such as stopping of the pipeline operations.

Next, the operation of the VLIW microprocessor of the tenth embodiment will be explained. The explanation of the multi-bypath processing of the multiplication result shown in FIG. 32 will be explained. In the tenth embodiment, the cross-bypath for the multiplication result is formed by the register 55, the multi-bypath (data transfer path) 227, the multi-bypath (data transfer path) 210, the register 211, and the multi-bypath (data transfer path) 212.

At first, the multiplication result executed in E stage of the pipeline 823 is stored into the register 57. The data stored in the register 57 is transferred to the write back register 56 during the W1 period in W stage through the buses E2D2BUS and E2D4BUS. The data stored in the write back register 56 is outputted onto the buses W1W3BUS and W1W3OBUS during the same W1 period and also transferred to the D1 synchronous bus group in the integer operation unit 4 through the multi-bypath 227. The output timing to the D1 synchronous bus group corresponds to the timing D1 in D stage of the pipeline 825 shown in FIG. 32.

The value on the buses W1W3EBUS and W1W3OBUS is stored into the register 211 whose writing timing is the same as the writing timing to the general purpose register file during the W2 period. The value stored in the register 211 is outputted into the D2 synchronous bus group in the memory access unit 3 through the cross-bypath 212. This output timing corresponds to the timing of the D2 in D stage of the pipeline 823 shown in FIG. 32. Thus, the multi-bypath processing for the multiplication result is executed from the W1 and W2 of the pipeline 823 to the D1 of the pipeline 824 and the D2 of the pipeline 825 in different timings.

As described above, according to the tenth embodiment of the present invention, when the destination register designation field of a preceding multiple instruction to be executed by the integer operation unit 4 is equal to the source register designation fields of instructions to be executed after two clocks of the execution of the above instruction by both the memory access unit 3 and the integer operation unit 4, and when data hazards happen between the plurality of operation units such as the operation units 3 and 4, a data item is transferred through the multi-bypaths between both operation units 3 and 4. Thereby, the VLIW microprocessor of the tenth embodiment is capable of avoiding occurrences of data hazards and of executing instructions efficiently while keeping data correct without penalties such as stopping of the pipeline operations.

Eleventh Embodiment

Figure 33:
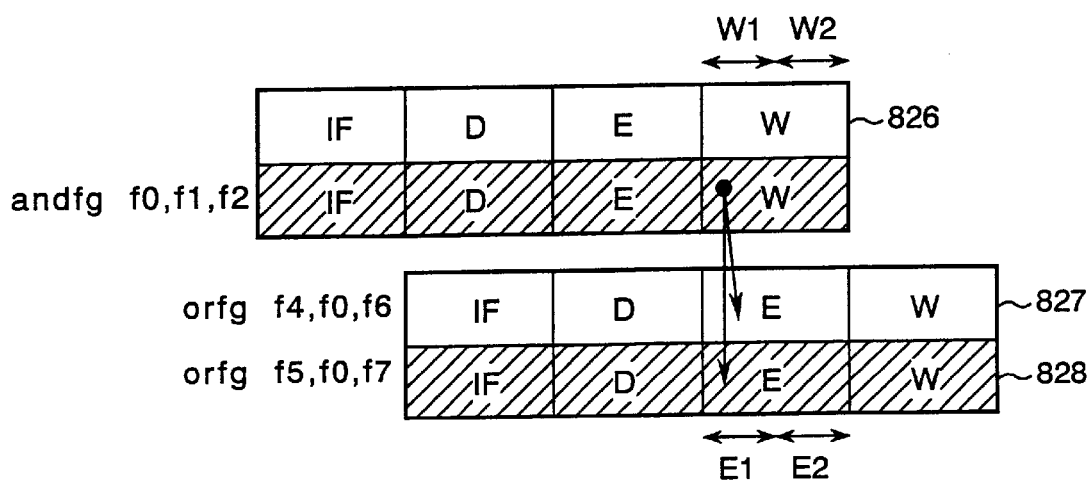
FIG. 33 is a timing chart showing a multi-bypath processing of the execution result of a flag operation sub-instruction in the VLIW microprocessor of the eleventh embodiment according to the present invention.

FIG. 33 is a timing chart showing a multi-bypath processing of the execution result of a flag operation sub-instruction in the VLIW microprocessor of the eleventh embodiment.

In the VLIW microprocessor of the eleventh embodiment, the result of a flag operation is transferred to a plurality of pipelines through the multi-bypaths (data transfer paths). The configuration of the VLIW microprocessor of the eleventh embodiment is same as that of the VLIW microprocessor of the first and fifth embodiments, therefore, the explanation of the configuration is omitted here.

In FIG. 33, the white sections designate the pipeline to be executed by the memory access unit 3 and the slant line sections indicate the pipeline executed by the integer operation unit 4.

The reference number 826 designates the pipeline of the flag operation instruction (andfg f0, f1, f2) executed by the memory access unit 3. The reference number 827 indicates the pipeline of the flag operation instruction (orfg f4, f0, f6) executed by the memory access unit 3. The reference number 828 denotes the pipeline of the flag operation instruction (orfg f5, f0, f7) executed by the integer operation unit 4.

In the eleventh embodiment, when the destination flag designation fields of preceding flag sub-instructions to be executed by both the memory access unit 3 and the integer operation unit 4 are equal to the source flag designation fields of instructions to be executed immediately following the above flag operation sub-instruction by both the memory access unit 3 and the integer operation unit 4, and when data hazards happen between a plurality of operation units such as the operation units 3 and 4, flags are transferred through the multi-bypaths between both operation units 3 and 4. Thereby, the VLIW microprocessor of the eleventh embodiment is capable of avoiding occurrences of data hazards and of executing instructions efficiently while keeping data correct without penalties such as stopping of the pipeline operations.

Next, the operation of the VLIW microprocessor of the eleventh embodiment will be explained.

The execution timing of a flag operation instruction in the VLIW microprocessor of the eleventh embodiment is the same as the timing of the pipeline shown in FIG. 25. The pipelines 827 and 828 receive the flag value from the flag operation instruction of the pipeline 826 through the cross-bypath. The execution result of the flag operation instruction is transferred from the W1 in W stage of the pipeline 826 to both the E1 of the pipeline 827 and the E1 of the pipeline 828.

Next, the explanation of the multi-bypath processing of the flag operation instructions will be explained with reference to the block diagram of the flag operation circuit shown in FIG. 24.

In the flag operation circuit shown in FIG. 24, the multi-bypath in order to transfer flag values between the flag operation instructions is formed by using the multi-bypaths 752 and 753. That is, the execution result of the flag operation instruction executed by the memory access unit 3 is transferred to both the memory access unit 3 and the integer operation unit 4 through the multi-bypath 752. Furthermore, the execution result of the flag operation instruction executed by the integer operation unit 4 is transferred to both the memory access unit 3 and the integer operation unit 4 through the multi-bypath 753.

The execution result of the flag operation instruction executed in E stage of the pipeline 826 is stored into the register 733. The execution result stored in the register 733 is transferred to the registers 726 and 728 through the multi-bypath 753 and the selectors 722 and 724 during the W1 period in W stage. The receiving timing of the execution result by the registers 726 and 728 corresponds to the timing of E stage of the pipelines 827 and 828.

As described above, according to the eleventh embodiment of the present invention, when the destination flag designation fields of a preceding flag operation sub-instruction to be executed by both operation units such as the memory access unit 3 and the integer operation unit 4 are equal to the source register designation fields of instructions to be executed immediately following the above instruction by both the memory access unit 3 and the integer operation unit 4, and when data hazards happen between the plurality of operation units such as the operation units 3 and 4, data items are transferred through the multi-bypaths between both operation units 3 and 4. Thereby, the VLIW microprocessor of the eleventh embodiment is capable of avoiding occurrences of data hazards and of executing instructions efficiently while keeping data correct without penalties such as stopping of the pipeline operations.

Twelfth Embodiment

Figure 34:
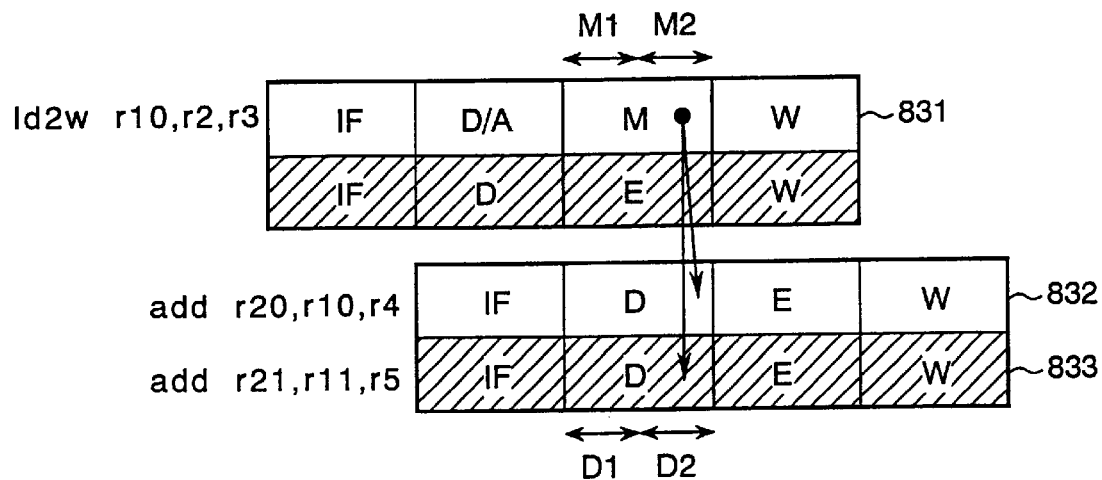
FIG. 34 is a timing chart showing a bypath processing of a plurality of pipelines of instructions having different operand sizes in the VLIW microprocessor of the twelfth embodiment according to the present invention.

FIG. 34 is a timing chart showing a bypath processing of a plurality of pipelines of instructions having different operand sizes in the VLIW microprocessor of the twelfth embodiment.

In FIG. 34, the white sections designate the pipeline to be executed by the memory access unit 3 and the slant line sections indicate the pipeline executed by the integer operation unit 4. The reference number 831 designates the pipeline of the load instruction (ld2w r10, r2, r3) for loading a double word data item executed by the memory access unit 3. The execution timing of the load instruction is same as the timing of the pipeline shown in FIG. 18.

The configuration of the VLIW microprocessor of the twelfth embodiment is same as that of the VLIW microprocessor of the first embodiment, therefore, the explanation of the configuration is omitted here.

In the twelfth embodiment, when the destination flag designation fields of preceding instructions handling a double word data item to be executed by both the memory access unit 3 and the integer operation unit 4 are equal to the source register designation fields of instructions to be executed after the preceding instruction by both the memory access unit 3 and the integer operation unit 4, and when data hazards happen between a plurality of operation units such as the operation units 3 and 4, data items are transferred through the selectors for selecting one of the upper word data item and the lower word data item and the multi-bypaths. Thereby, the VLIW microprocessor of the twelfth embodiment is capable of avoiding occurrences of data hazards and of executing instructions efficiently with keeping data correctly without penalties such as stopping of the pipeline operations.

Next, the operation of the VLIW microprocessor of the twelfth embodiment will be explained.

The loaded double word data is received by the registers R10 and R11 in the general purpose register file 5. The reference number 832 designates the pipeline of the add instruction (add r20, r10, r4) to be executed by the memory access unit 3. This add instruction receives the upper word data item in the double word data obtained by executing a fetch operation in the load instruction through the bypath. The reference number 833 denotes the pipeline of the add instruction (add r21, r11, r5) to be executed by the memory access unit 4. This add instruction receives the lower word data item in the double word data obtained by executing the fetch operation in the load instruction through the bypath.

As shown by arrows in FIG. 34, the different word data items in the double word data are transferred from the M2 in M stage of the pipeline 831 to the D2 in D stage of the pipeline 832 and to the D2 in D stage of the pipeline 833 through the bypaths.

As described above, according to the VLIW microprocessor of the twelfth embodiment, when the destination flag designation fields of preceding instructions handling a double word data item to be executed by both the memory access unit 3 and the integer operation unit 4 are equal to the source register designation fields of instructions to be executed after the preceding instruction by both the memory access unit 3 and the integer operation unit 4, and when data hazards happen between a plurality of operation units such as the operation units 3 and 4, data items are transferred through the selectors for selecting one of the upper word data item and the lower word data item and the multi-bypaths. Thereby, the VLIW microprocessor of the twelfth embodiment is capable of avoiding occurrences of data hazards and of executing instructions efficiently while keeping data correct without penalties such as stopping of the pipeline operations.

As described above in detail, according to the present invention, the data processing device has the configuration in which the data transfer paths are incorporated among the plurality of instruction execution means, the control means controls the operation of the selection means and the data transfer is directly executed among the plurality of instruction execution means without transferring data through the plurality of registers. Thereby, even if data hazard happen among the plurality of instruction codes executed in different pipelines, data can be directly transferred between the plurality of execution means through the data transfer paths. It becomes possible to execute instructions efficiently while keeping the data correct without stopping the pipeline operations.

In addition, according to the data processing device of the present invention, even if a destination register designation field of a preceding sub-instruction executed in one pipeline is equal to a source register designation field of the following sub-instruction to be executed by another pipeline, and when data hazard happens among the plurality of instruction codes executed in different pipelines, data can be directly transferred between the plurality of pipelines through the data transfer paths. Thereby, it becomes possible to execute instructions efficiently while keeping the data correct without stopping the pipeline operations.

Furthermore, according to the data processing device of the present invention, when a destination register designation field of a preceding load sub-instruction executed in one pipeline is equal to a source register designation field of the load sub-instruction to be executed immediately following the execution of the above pipeline by another pipeline, data can be directly transferred between the plurality of execution means through the data transfer paths. Thereby, it becomes possible to execute instructions efficiently while keeping the data correct without stopping the pipeline operations.

In addition, according to the data processing device of the present invention, when a destination register designation field of a preceding multiple sub-instruction executed by one pipeline is equal to a source register designation field of the multiple sub-instruction to be executed after the above sub-instruction by another pipeline, data can be directly transferred between these pipelines through the data transfer paths. Thereby, it becomes possible to execute instructions efficiently while keeping the data correct without stopping the pipeline operations.

Furthermore, according to the data processing device of the present invention, when a destination register designation field of a preceding arithmetic sub-instruction executed by one pipeline is equal to a source register designation field of the arithmetic sub-instruction to be executed after the execution of the above sub-instruction by another pipeline, data can be directly transferred between these instruction execution means through the data transfer paths. Thereby, it becomes possible to execute instructions efficiently while keeping the data correct without stopping the pipeline operations.

Moreover, according to the data processing device of the present invention, when a destination register designation field of a preceding flag operation sub-instruction executed by one pipeline is equal to a source flag designation field of the flag operation sub-instruction to be executed immediately following the execution of the above sub-instruction by another pipeline, the flag value can be directly transferred between the pipelines through data transfer paths. Thereby, it becomes possible to execute instructions efficiently while keeping the data correct without stopping the pipeline operations.

Furthermore, according to the data processing device of the present invention, when an updated flag by execution of a preceding arithmetic sub-instruction executed by two pipelines is equal to a source flag designation field of the flag operation sub-instruction to be executed immediately following the execution of the above sub-instruction by both instruction execution means, the flag value can be directly transferred between these instruction execution means through the data transfer paths. Thereby, it becomes possible to execute instructions efficiently while keeping the data correct without stopping the pipeline operations.

In addition, according to the data processing device of the present invention, when a destination register designation field of a preceding sub-instruction handling a double word data item executed by one pipeline is equal to a source register designation field of a following sub-instruction handling a word data item to be executed by another pipeline, and when a data hazard happens between different pipelines, the data can be transferred through the cross-bypath and selection means for selecting one of the upper word data and the lower word data in the double word data. Thereby, it becomes possible to execute instructions efficiently while keeping the data correct without stopping the pipeline operations.

Furthermore, according to the present invention, when a destination register designation field of a preceding load sub-instruction executed by one pipeline is equal to a source register designation field of a sub-instruction to be executed immediately following the execution of the above sub-instruction by a plurality of pipelines, and when data hazard happens among the plurality of pipelines, the data can be transferred through the cross-bypath. Thereby, it becomes possible to execute instructions efficiently while keeping the data correct without stopping the pipeline operations.

In addition, according to the present invention, when a destination register designation field of a preceding load sub-instruction executed by one pipeline is equal to a source register designation field of the instruction to be executed by a plurality of pipelines immediately following the execution of the above load sub-instruction, and when a data hazard happens among the plurality of the pipelines, the data can be transferred through the cross-bypath. Thereby, it becomes possible to execute instructions efficiently while keeping the data correct without stopping the pipeline operations.

Furthermore, according to the present invention, when a destination register designation field of a preceding multiple sub-instruction executed by one pipeline is equal to a source register designation field of the sub-instruction to be executed by a plurality of pipelines after the execution of the above multiple sub-instruction, and when a data hazard happens among the plurality of pipelines, the data can be transferred through the cross-bypath. Thereby, it becomes possible to execute instructions efficiently while keeping the data correct without stopping the pipeline operations.

Moreover, according to the present invention, when a destination flag designation field of a preceding flag operation sub-instruction executed by one pipeline is equal to a source flag designation field of the flag operation sub-instruction to be executed by a plurality of pipelines immediately following the execution of the above sub-instruction, and when a data hazard happens among the plurality of pipelines, the data can be transferred through the cross-bypath. Thereby, it becomes possible to execute instructions efficiently while keeping the data correct without stopping the pipeline operations.

Furthermore, according to the present invention, when a destination register designation field of a preceding sub-instruction handling double word data executed by one pipeline is equal to a source register designation field of a following sub-instruction to be executed by a plurality of pipelines, and when a data hazard happens among the plurality of pipelines, the data can be transferred through the cross-bypath and selection means for selecting one of the upper word data and the lower word data in the double word data. Thereby, it becomes possible to execute instructions efficiently while keeping the data correct without stopping the pipeline operations.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A data processing device comprising:
   instruction decode means, connected to memories for storing instructions including a plurality of sub-instructions and data, for decoding the instructions;
   a plurality of instruction execution means, connected to the instruction decode means, including a plurality of registers and at least one operation circuit for executing arithmetic operations based on the instructions, for executing the instructions under pipeline control according to decode results provided by the instruction decode means;
   a plurality of data transfer paths incorporated between each of the plurality of instruction execution means, for directly transferring data between the plurality of instructions execution means without passing through the plurality of registers;
   control means, incorporated in the instruction decode means, for generating a control signal to select one of the plurality of data transfer paths through which data is directly transferred from one instruction execution means to another based on a sub-instruction to be executed when said control means detects an occurrence of data hazard between said plurality of instruction execution means during instruction decoding stage in a pipeline performed by said instruction decode means; and
   selection means, positioned along the data transfer paths, for selecting whether or not the data transfer is executed through the data transfer paths according to the control signal transferred from the control means.

2. A data processing device as claimed in claim 1, wherein the instruction execution means includes two instruction execution means, the selection means includes a tri-state buffer and a selector, the control means includes comparison means for comparing a destination register designation field of a preceding sub-instruction executed by one pipeline with a source register designation field of a sub-instruction to be executed by another pipeline, and the operation of the selection means is controlled based on a comparison result of the comparison means.

3. A data processing device as claimed in claim 2, wherein the selection means includes a tri-state buffer, and when the preceding sub-instruction is a load sub-instruction, the control means includes comparison means for comparing a destination register designation field of the load sub-instruction with a source register designation field of a load sub-instruction to be executed by another pipeline, and a data item transferred through the selected data transfer path is driven to a source bus connected to the instruction execution means according to the operation of the selection means that is being controlled based on a comparison result of the comparison means.

4. A data processing device as claimed in claim 2, wherein the selection means includes a tri-state buffer, when the preceding sub-instruction is a multiplication sub-instruction, the control means includes comparison means for comparing a destination register designation field of the multiplication sub-instruction with a source register designation field of a multiplication sub-instruction to be executed by another pipeline, and a data item transferred through the selected data transfer path is driven to a source bus connected to the instruction execution means according to the operation of the selection means that is being controlled based on a comparison result of the comparison means.

5. A data processing device as claimed in claim 2, wherein the selection means includes a tri-state buffer, when the preceding sub-instruction is an arithmetic sub-instruction, the control means includes comparison means for comparing a destination register designation field of the arithmetic sub-instruction with a source register designation field of an arithmetic sub-instruction to be executed by another pipeline, and a data item transferred through the selected data transfer path is driven to a source bus connected to the instruction execution means according to the operation of the selection means that is being controlled based on a comparison result of the comparison means.

6. A data processing device as claimed in claim 2, wherein the selection means includes a selector, when the preceding sub-instruction is a flag operation sub-instruction, the control means includes comparison means for comparing a destination register designation field of the flag operation sub-instruction with a source flag designation field of a flag operation sub-instruction to be executed by another pipeline, and a data item transferred through the selected data transfer path is selected by controlling the operation of the selection means based on a comparison result of the comparison means.

7. A data processing device as claimed in claim 2, wherein the selection means includes a selector, when the preceding sub-instruction is an arithmetic sub-instruction by which a flag is generated, the control means includes comparison means for comparing a predetermined flag update position of the arithmetic sub-instruction with a source flag designation field of a flag operation sub-instruction to be executed by another pipeline, and a data item transferred through the selected data transfer path is selected by controlling the operation of the selection means based on a comparison result of the comparison means.

8. A data processing device as claimed in claim 2, wherein the selection means includes a tri-state buffer, and the control means includes comparison means with a bit size corresponding to an operand size of a destination register designation field of the preceding sub-instruction and also corresponding to an operand size of a source register designation field of the sub-instruction to be executed by another pipeline, the comparison means comparing the destination register designation field of the preceding sub-instruction with the source register designation field of the sub-instruction to be executed, the operation of the selection means is controlled based on a comparison result of the comparison means, and a data item transferred through the selected data transfer path and the selector connected to the selected data transfer path is driven to a source bus connected to the instruction execution means.

9. A data processing device as claimed in claim 1, wherein the selection means includes a tri-state buffer and a selector, the control means includes comparison means for comparing a destination register designation field of the preceding sub-instruction with a source register designation field of a sub-instruction to be executed by a plurality of pipelines, and the operation of the selection means is controlled based on a comparison result of the comparison means.

10. A data processing device as claimed in claim 9, wherein the selection means includes a tri-state buffer, and when the preceding sub-instruction is a load sub-instruction, the control means includes comparison means for comparing a destination register designation field of the load sub-instruction with a source register designation field of a load sub-instruction to be executed by a plurality of pipelines, and a data item transferred through the selected data transfer path is driven to a source bus connected to a plurality of instruction execution means according to a comparison result of the comparison means.

11. A data processing device as claimed in claim 9, wherein the selection means includes a tri-state buffer, when the preceding sub-instruction is a multiplication sub-instruction, the control means includes comparison means for comparing a destination register designation field of the multiplication sub-instruction with a source register designation field of a multiplication sub-instruction to be executed by a plurality of pipeline, and a data item transferred through the selected data transfer path is driven to a source bus connected to a plurality of instruction execution means according to the operation of the selection means that is being controlled on a comparison result of the comparison means.

12. A data processing device as claimed in claim 9, wherein the selection means includes a selector, when the preceding sub-instruction is a flag operation sub-instruction, the control means includes comparison means for comparing a destination flag designation field of the flag operation sub-instruction with a source flag designation field of a flag operation sub-instruction to be executed by a plurality of pipelines, and a data item transferred through the selected data transfer path is selected by controlling the operation of the selection means based on a comparison result of the comparison means.

13. A data processing device as claimed in claim 9, wherein the selection means includes a tri-state buffer, and the control means includes comparison means whose bit size corresponds to an operand size of a destination register designation field of the preceding sub-instruction and also corresponds to an operand size of a source register designation field of a sub-instruction to be executed by a plurality of pipelines, and the operation of the selection means is controlled based on a comparison result of the comparison means, and a data item transferred through the selected data transfer path and the selector connected to the selected data transfer path is driven to a source bus connected to the plurality of instruction execution means.

* * * * *